US010506686B2

(12) United States Patent
Chen

(10) Patent No.: US 10,506,686 B2
(45) Date of Patent: *Dec. 10, 2019

(54) SENSING MODULE, SENSING LAMP HAVING THE SAME, WALL SWITCH HAVING THE SAME, AND LED WALL LAMP

(71) Applicant: Vaxcel International Co., Ltd., Carol Stream, IL (US)

(72) Inventor: Chia-Teh Chen, Taipei (TW)

(73) Assignee: VAXCEL INTERNATIONAL CO., LTD., Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,615

(22) Filed: May 24, 2019

(65) Prior Publication Data

US 2019/0281687 A1 Sep. 12, 2019

Related U.S. Application Data

(63) Continuation of application No. 16/286,491, filed on Feb. 26, 2019, which is a continuation of application (Continued)

(51) Int. Cl.
*H05B 37/02* (2006.01)
*F21V 23/04* (2006.01)
(Continued)

(52) U.S. Cl.
CPC .......... *H05B 37/0227* (2013.01); *F21S 8/036* (2013.01); *F21V 17/12* (2013.01);
(Continued)

(58) Field of Classification Search
CPC .... F21V 21/14; F21V 23/001; F21V 23/0471; F21S 8/08
See application file for complete search history.

(56) References Cited

U.S. PATENT DOCUMENTS 5,377,076 A 12/1994 Wen
5,590,953 A 1/1997 Haslam et al.
(Continued)

FOREIGN PATENT DOCUMENTS

AU 2014101344 A4 12/2014
CN 2208253 Y 9/1995

OTHER PUBLICATIONS

Use and Care Guide, "Motion Security Light", "Defiant",Item #1000048906, 1000048907,Model #DF-5936-BK,DF-5936-WH, homedepot.com.

*Primary Examiner* — Douglas W Owens
*Assistant Examiner* — Pedro C Fernandez
(74) *Attorney, Agent, or Firm* — Li & Cai Intellectual Property (USA) Office

(57) ABSTRACT

A sensing lamp includes a lamp body connected with a sensing module. The sensing module is configured with a sensing unit and a cover partially covering the sensing unit. The sensing unit has a passive infrared ray sensor and at least one parameter adjusting element. The sensing unit is rotatable around a central axis passing thru the sensing module and the lamp body. When the sensing unit is rotated to a first angle position, the at least one parameter adjusting element is blocked and the passive infrared ray sensor is able to perform a forward sensing function. When the sensing unit is rotated to a second angle position, the at least one parameter adjusting element is exposed to being conveniently adjusted. The passive infrared ray sensor is configured with a partial cylindrical condensing lens for performing a horizontal detection angle ranging from 100 degrees to 270 degrees.

27 Claims, 21 Drawing Sheets

Related U.S. Application Data

No. 16/129,876, filed on Sep. 13, 2018, now Pat. No. 10,264,654, which is a continuation of application No. 15/375,616, filed on Dec. 12, 2016, now Pat. No. 10,117,313, which is a continuation-in-part of application No. 14/828,373, filed on Aug. 17, 2015, now Pat. No. 9,551,481.

(51) Int. Cl.

| | | |
|---|---|---|
| *F21V 23/00* | (2015.01) | |
| *F21V 21/14* | (2006.01) | |
| *F21S 8/00* | (2006.01) | |
| *F21V 17/12* | (2006.01) | |
| *F21V 23/06* | (2006.01) | |
| *F21Y 115/10* | (2016.01) | |

(52) U.S. Cl.
CPC ............ *F21V 21/14* (2013.01); *F21V 23/009* (2013.01); *F21V 23/045* (2013.01); *F21V 23/0464* (2013.01); *F21V 23/0471* (2013.01); *F21V 23/06* (2013.01); *H05B 37/0272* (2013.01); *F21Y 2115/10* (2016.08)

(56) References Cited

U.S. PATENT DOCUMENTS

| | | |
|---|---|---|
| 5,662,411 A | 9/1997 | Haslam et al. |
| 6,323,488 B1 | 11/2001 | McCavit et al. |
| 6,747,275 B2 | 6/2004 | Raper et al. |
| 6,781,129 B2 | 8/2004 | Leen et al. |
| 6,943,687 B2 | 9/2005 | Lee et al. |
| 7,438,438 B2 | 10/2008 | Sandell |
| 7,473,899 B2 | 1/2009 | Chi et al. |
| 7,635,846 B2 | 12/2009 | Chi et al. |
| 7,934,854 B2 | 5/2011 | Anglikowski et al. |
| 8,063,375 B2 * | 11/2011 | Cobbinah ............ A61B 5/1113 250/338.3 |
| 8,917,024 B2 | 12/2014 | Sloan et al. |
| 9,143,741 B1 | 9/2015 | Fu et al. |
| 9,172,917 B1 | 9/2015 | Fu et al. |
| 9,542,832 B1 | 1/2017 | Fu et al. |
| 9,568,356 B2 | 2/2017 | Sloan et al. |
| 9,654,678 B1 | 5/2017 | Fu et al. |
| 9,726,359 B1 | 8/2017 | Jensen et al. |
| 2008/0068841 A1 | 3/2008 | Chi et al. |
| 2009/0168412 A1 * | 7/2009 | Murphy .................. F21L 4/045 362/202 |
| 2014/0268881 A1 * | 9/2014 | Ku ...................... F21V 23/0464 362/642 |

* cited by examiner

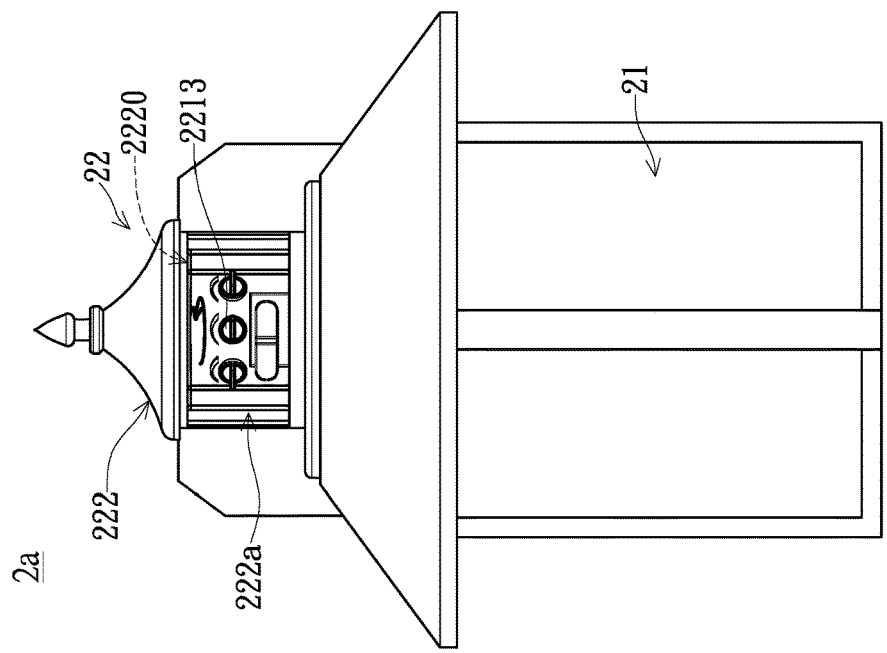
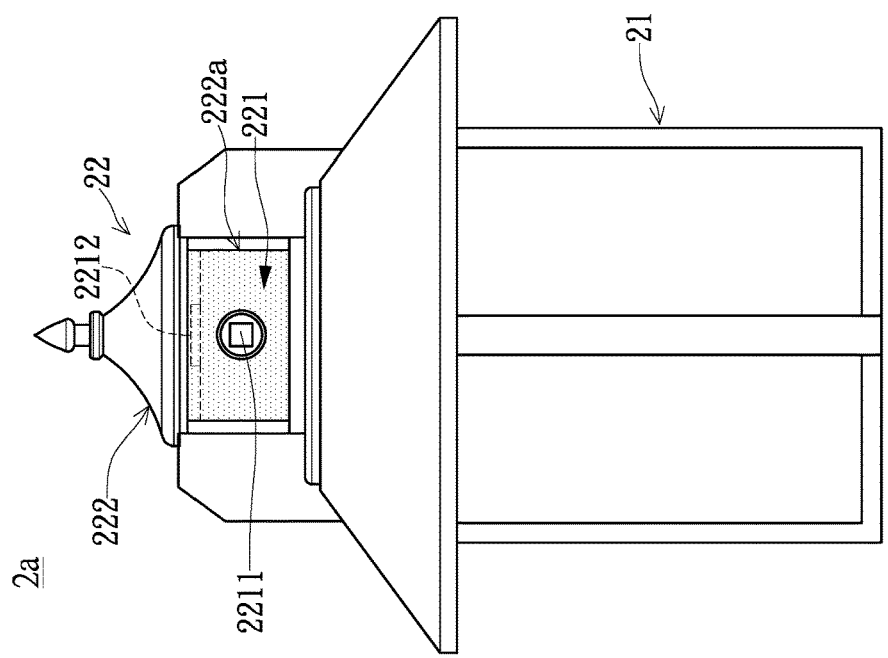

ND LED WALL LAMP

SENSING MODULE, SENSING LAMP HAVING THE SAME, WALL SWITCH HAVING THE SAME, AND LED WALL LAMP

CROSS REFERENCE TO RELATED APPLICATIONS

This application is a continuation application of prior application Serial No. U.S. Ser. No. 16/286,491 filed on Feb. 26, 2019, the entire contents of which are incorporated herein by reference. The application Serial No. U.S. Ser. No. 16/286,491 filed on Feb. 26, 2019, is a continuation application of prior application Serial No. U.S. Ser. No. 16/129,876 filed on Sep. 13, 2018, now issued as U.S. Pat. No. 10,264,654 B2. The application Serial No. U.S. Ser. No. 16/129,876 is a continuation application of prior application Serial No. U.S. Ser. No. 15/375,616 filed on Dec. 12, 2016, now issued as U.S. Pat. No. 10,117,313 B2, and entitled SENSING LAMP AND SENSING MODULE THEREOF. The application Serial No. U.S. Ser. No. 15/375,616 is a Continuation-in-Part of prior application Ser. No. 14/828,373, filed on Aug. 17, 2015, now issued as U.S. Pat. No. 9,551,481, and entitled SENSING LAMP.

BACKGROUND OF THE INVENTION

1. Field of the Invention

The present disclosure relates to lighting; in particular, to a sensing module of a sensing lamp.

2. Description of Related Art

A conventional wall lamp is illustrated in FIG. 1A. For considering the design of the structure's appearance, the conventional wall lamp 1 can be divided into a light body 11 and a back plate 12. The shape of the light body 11 is designed according to the requirement of the user. The back plate 12 is used for installing the wall lamp to a wall. Today, the lighting requirement for the user varies due to the user's presence; therefore the technology of sensing light has been developed. Utilizing a sensor for sensing the environment (environment light or the user activity), the sensing lamp can turn off the light source when the light is not required. For example, the wall lamp shown in FIG. 1A can be added with a sensor 111. The sensor 111 usually is a light sensor or a motion sensor. When the sensor 111 of the wall lamp senses that the environment light is not enough or the user is approaching, the sensor 111 can turn on the light.

Conventionally, the sensor and the control circuit of the wall lamp are individually arranged. As shown in FIG. 1A, the sensor 111 can be disposed on the top (or the bottom) of the light body 11. The designed position of the sensor 111 is for obtaining a more accurate sensing result or larger sensing range. Besides, the location of the sensor 111 shown in FIG. 1A may be positioned at different positions. For example, referring to the conventional wall lamp 1' shown in FIG. 1B, the sensor 122 is disposed on the back plate 12', and the operating parameter adjusting element 121' is disposed at the bottom of the back plate 12'.

Referring to FIG. 1A again, the control circuit (not shown in FIG. 1A) connecting the sensor 111 is usually disposed in the back plate 12. In order to let the user easily adjust the related parameter of the sensor 111 such as the sensitivity, brightness or time of the light mode, or the start time of turning on the light, the operating parameter adjusting element(s) (for example, the switch or knob) is (are) exposed on the surface (for example, bottom surface or side surface) of the back plate 12. That is, the design of the back plate 12 has to fit in with the wiring and switching element (or adjusting element) of the control circuit, and the appearance design of the back plate 12 is so restricted accordingly. Taking FIG. 1A as an example, two operating parameter adjusting elements 121 are disposed at the bottom surface of the back plate 12. The user can manipulate the operating parameter adjusting elements to adjust the light mode or lighting parameters of the sensing wall lamp. In the same way, the operating parameter adjusting element 121' shown in FIG. 1B is disposed at the bottom of the back plate 12. Because the operating parameter adjusting elements are usually located at the bottom of the back 12', it cannot accord with user-friendly adjustment, and the design flexibility of the back plate is limited.

Please refer to FIG. 2 showing a block diagram of a conventional sensing wall lamp. The control circuit 13 receives exterior electrical power, and the control circuit 13 is electrically coupled to the light source 110 (disposed in the light body 11 shown in FIG. 1), the sensor 111 and the parameter adjusting element 121. However, referring to FIG. 3, based on the circumstance of arranging the sensor 111 and the corresponding circuit 13 separately and individually, a plurality of conducting wires (for example the two conducting wires 2211 shown in FIG. 3) for connecting the sensor 111 and the control circuit 13 may be required, according to the complexity of the sensor 111 (or the types of the adjusted parameters of the wall lamp). Furthermore, the power wires of the light source 110 in the light body 11 and the control wires 2213 of the operating parameter adjusting elements 121 lead to the complicated wiring of the elements in the lamp. As such, the related cost of production of the lamp product and the probability of defects resulting during the production process would be increased.

Refer to FIG. 2A, showing a block diagram of another conventional sensing wall lamp. A conventional wall lamp 6 includes a light base 60 and a light source 610 that is detachably connected to the light base 60. The light base 60 has a light body 61 and a sensing module 62. The sensing module 62 can include a sensor and a parameter adjusting element. The sensing module 62 is usually equipped in and connected structurally to the light body 61, and it is non-detachably fixed inside of the sensing wall lamp. Another conventional wall lamp with sensing feature is a regular wall lamp equipped with a separated sensing module.

The non-detachably fixed sensing module lacks usability for parameter adjustment while the independently located sensing module always requires separated power supply and wiring.

Further, conventionally the sensing module appears to be part of outlined design of a sensing lamp. This very much limits the industrial design of a sensing lamp. A sensing lamp may have some restriction in decoration design while a decoration lamp is not easily converted to be with a sensing feature.

SUMMARY OF THE INVENTION

One of the objects of the present disclosure is to provide a detachable sensing module for being easily installed and used with a sensing lamp. Moreover to provide a detachably sensing module for easily installed (usually detachably attached with a light source) inside of a lamp so that the outlined design is not limited. The sensing module can further include a light source. The integrated sensing module provides many advantages to consumers: Easy installation and operating parameter adjustment, flexible in lamp design and one device for sensing, adjustment and lighting functions.

In order to achieve the aforementioned objects, according to an embodiment of the present disclosure, a sensing module is provided. A sensing module, detachably connectable to a light body, the sensing module comprising: a sensing unit, having at least one sensor, a control circuit and at least one operating parameter adjusting element, the sensor and the operating parameter adjusting element electrically coupled to the control circuit, the control circuit disposed in the sensing unit; and a connecting module electrically coupled and mechanically connected with the sensing unit; wherein the connecting module is detachably connectable to the light body.

In one embodiment, the connecting module is constructed to comprise a screw-in base disposed on the top of the sensing module and a screw-in socket disposed under the sensing module, wherein the screw-in base allows the sensing module electrically connectable with the light body; wherein the screw-in socket allows a screw-in light source connectable to the sensing module. The screw-in base and socket are just taken for example. It could be another type of sockets such as bi-pin or GU24.

In order to achieve the aforementioned objects, according to an embodiment of the present disclosure, a sensing module is provided. A sensing module, detachably connectable to a light body, the sensing module comprising: a sensing unit, having at least one sensor, a control circuit and at least one operating parameter adjusting element, the sensor and the operating parameter adjusting element electrically coupled to the control circuit, a light source, being capable to be turned on or adjusted illumination characteristics by the sensing unit selectively; and a housing, wherein the sensing unit and the light source are assembled with the housing.

In one embodiment, the housing further comprises a screw-in base disposed on top of the housing, wherein the screw-in base allows the sensing module electrically connectable with the light body. The screw-in base is only an example, the connection may be others such as bi-pin or GU24 connectors.

In summary, a sensing lamp is provided, in which the sensor and the control circuit are integrated into the sensing module. As such, the wiring layout is simple, the arrangement of control wires or power wires is simplified, and the related cost of production of the lamp product and the probability of defects resulting during production process can be reduced. The sensing lamp is provided with a user-friendly way for adjustment, a more concise and aesthetic appearance (the operating parameter adjusting element is concealed). By utilizing the rotatable sensing unit of the sensing lamp, the user can easily rotate the sensing unit to an angle (the second angle) adapted for operating the operating parameter adjusting element(s), so as to adjust the related parameter of the sensing unit. After the adjustment is finished, the sensing unit can return to the normal operation angle (the first angle). Because the back plate of the sensing lamp is not restricted to be incorporated with the operating parameter adjusting element(s), the design flexibility is significantly increased when considering matching the back plate to the aesthetic appearance of the overall light body.

In order to further the understanding regarding the present disclosure, the following embodiments are provided along with illustrations to facilitate the disclosure of the present disclosure.

BRIEF DESCRIPTION OF THE DRAWINGS

FIG. 16A shows a front view of the sensing lamp in a normal status with a rotatable sensing unit according to FIG. 4 of the present disclosure;

FIG. 16B shows a front view of the sensing lamp in an adjustment status by rotating the sensing unit according to 16A of the present disclosure;

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

An Embodiment of the Sensing Lamp

Figure 4:
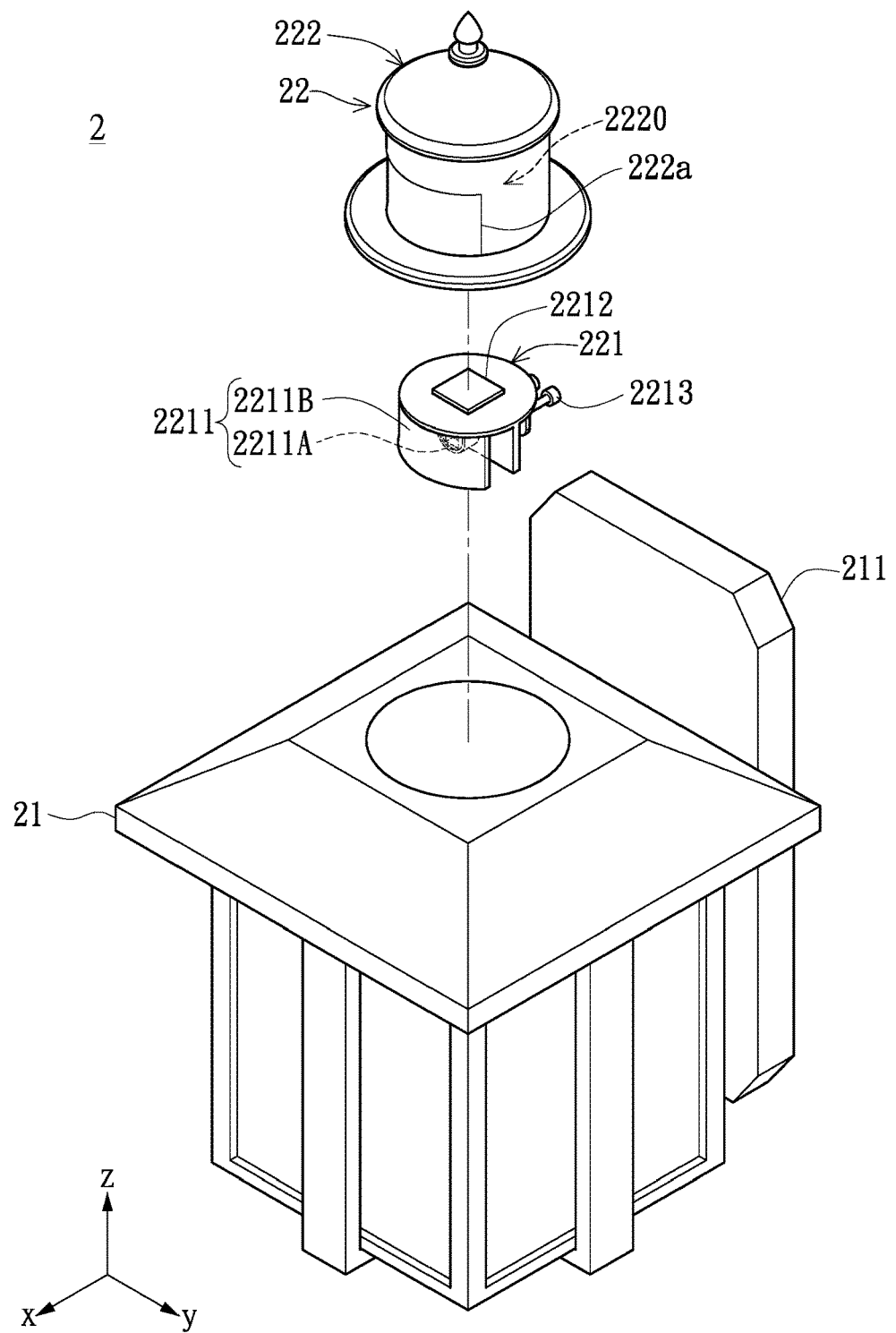
FIG. 4 shows an exploded view drawing of a sensing lamp according to an embodiment of the present disclosure.

Please refer to FIG. 4 showing an exploded view drawing of a sensing lamp according to an embodiment of the present disclosure. The sensing lamp 2 comprises a light body 21 and a sensing module 22. The light body 21 has a light source. The light source is usually disposed in the light body 21, and the light source is not shown in FIG. 4. An artisan of ordinary skill in the art will appreciate the design manner of the light source. The light source can be an LED light source, an incandescent light source or a fluorescent light source, but the present disclosure is not so restricted. In this embodiment, the sensing lamp 2 is a wall lamp, but the present disclosure is not so restricted. The light body 21 has a back plate 211 for connecting to the wall. In general, the power wires of the sensing lamp 2 are connected to the light source and the related circuit of the sensing module 22 through the back plate 211. The back plate 211 of the sensing lamp 2 in this embodiment does not include any exposed operating parameter adjusting element. This embodiment integrates the sensing module 22 with the control circuit and cooperates with the design of built-in operating parameter adjusting element of the sensing module 22, for simplifying the assembling of the wires and elements of the sensing lamp 2.

Figure 1A:
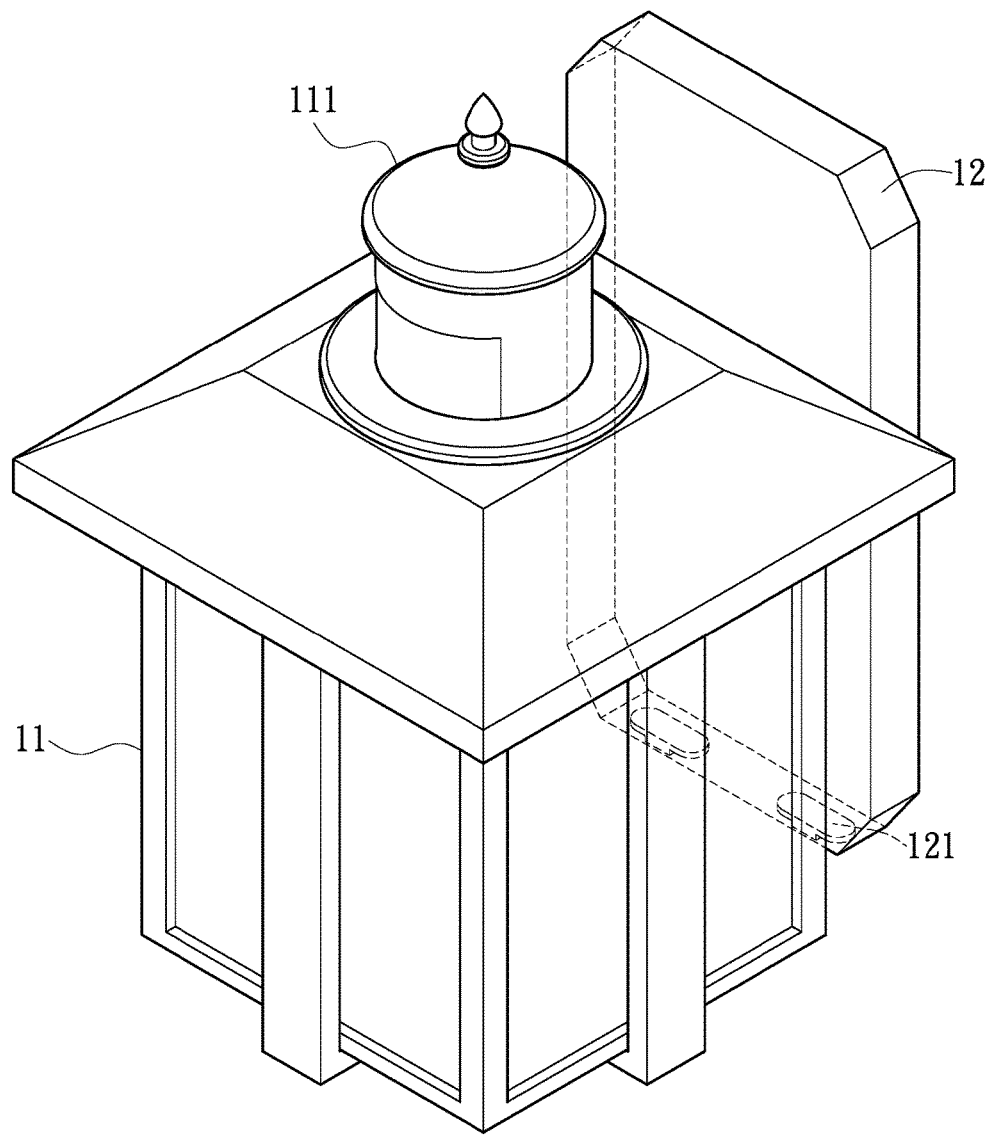
FIG. 1A shows a schematic diagram of a conventional sensing wall lamp.
Figure 1B:
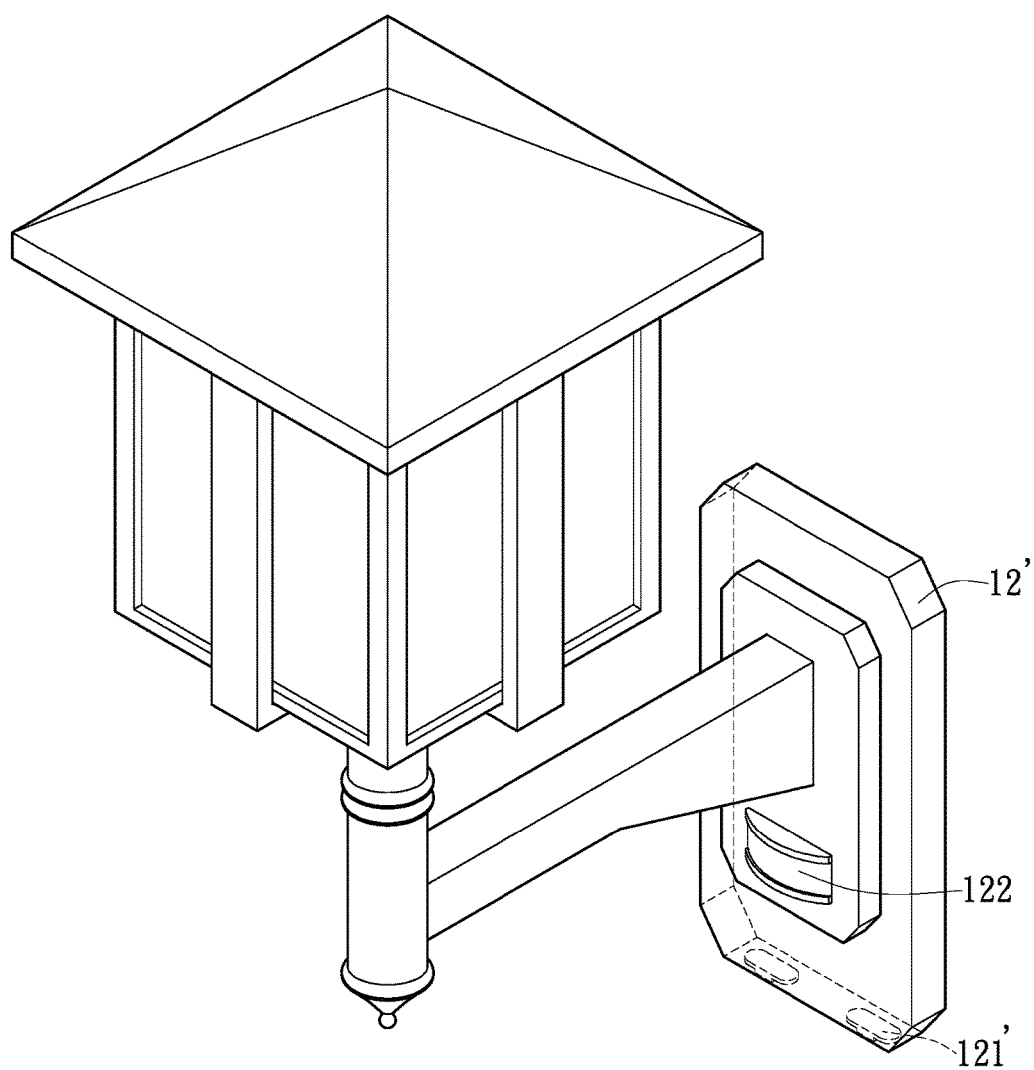
FIG. 1B shows a schematic diagram of a conventional sensing wall lamp.
Figure 2:
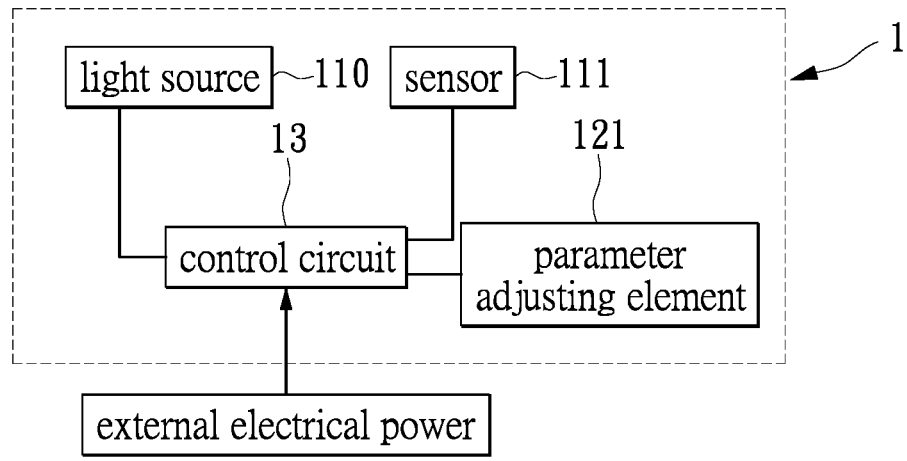
FIG. 2 shows a block diagram of a conventional sensing wall lamp.
Figure 2A:
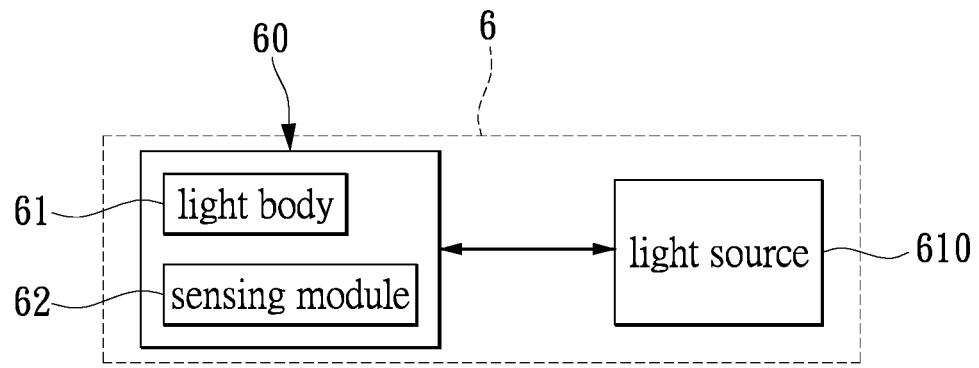
FIG. 2A shows a block diagram of a conventional sensing lamp.
Figure 5:
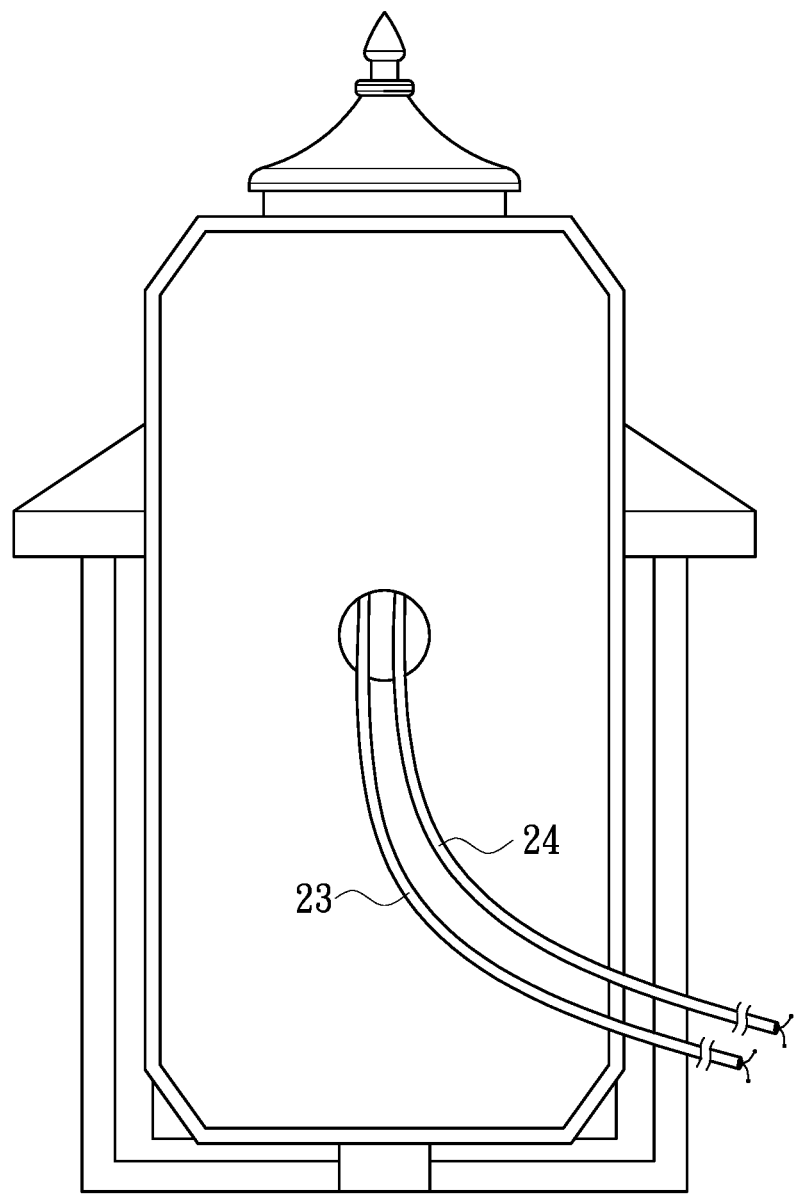
FIG. 5 shows a back view drawing of a sensing lamp according to an embodiment of the present disclosure.

Please refer to FIG. 5 showing a back view drawing of a sensing lamp according to an embodiment of the present disclosure. The sensing lamp 2 provides a user-friendly way for adjustment and a more concise and aesthetic appearance (the parameter adjusting element is concealed). For example, the back plate 211 of the sensing lamp 2 can lead out the power wires 23 of the light source and the power wires 24 of the sensing module 22, and as such the wiring is simple. It only requires connecting these wires from the back plate to the exterior electrical power source or driving circuit. Therefore, by reducing the elements and the complexity of the wiring, the related cost of production of the lamp product and the probability of defects resulting during the production process can be decreased. The back plate 211 is not required to be designed for cooperating with the wiring of the power wires, control wires, switches, or adjusting elements. As such, the design of the back plate can be more flexible. Basically, the back plate 211 can be designed according to the structure requirements without considering the sensing module 22. The complex design of the back plate 12 of the wall lamp 1 shown in FIG. 1 can be avoided. Further, in the subsequent embodiments, a sensing lamp without the back plate can also lead the power wires out of the light source and the sensing module, for achieving simplicity of the wiring.

Figure 3:
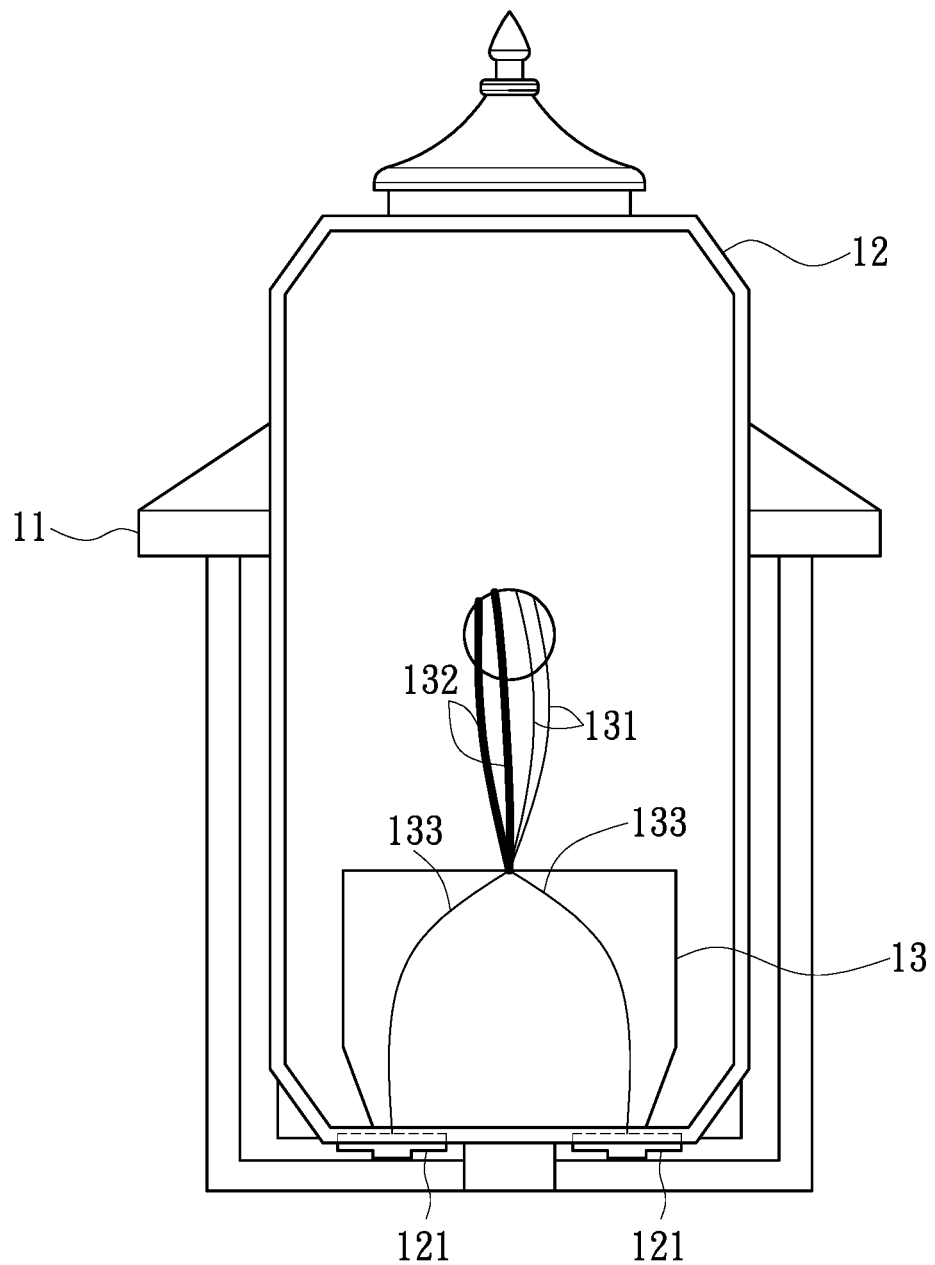
FIG. 3 shows a back view drawing of a conventional sensing wall lamp.

Please refer to FIG. 4 again. The sensing module 22 connects with the light body 21. As shown in FIG. 4, the sensing module 22 is disposed on the light body 21. However, in another embodiment, the sensing module 22 can be changed to connect with the bottom of the light body 21 or another position of the light body 21. Alternatively, the sensing module 22 can be disposed on the back plate (referred to subsequent embodiments). The location of the sensing module 22 can be changed according to practical applications (for example, the road lamp, the chandelier or the ceiling lamp), for the purpose of making the sensing module 22 be able to obtain the required sensing range, wherein the sensing range is determined in the design phase of the sensing light. In FIG. 4, the sensing module 22 includes a sensing unit 221 and a cover 222. The sensing unit 221 has a sensor 2211, a control circuit 2212 and at least one operating parameter adjusting element 2213. The sensor 2211 and the operating parameter adjusting element 2213 are electrically coupled to the control circuit 2212. The control circuit 2212 of the sensing unit 221 is connected to an exterior electrical power source or a driving circuit (not shown in FIG. 4). The sensing unit 221 integrated with the conventional control circuit (referring to the control circuit 13 shown in FIG. 3) can be made on a single circuit board, in order to simplify the complexity of the circuit (or wiring). The sensing unit 221 shown in FIG. 4 is just an exemplary embodiment in order to describe the present disclosure in an understandable and clear way, but the structure of the sensing unit 221 is not so restricted.

A first side of the sensing unit 221 is provided with the sensor 2211. A second side of the sensing unit 221 is provided with the operating parameter adjusting element 2213. The sensing unit 221 can be an infrared sensing unit, a microwave sensing unit, a light sensing unit, or any combination thereof. However, this present disclosure does not limit the type of the sensing unit 221. The operating parameter adjusting element 2213 can be a slide switch, a knob, and so on, this present disclosure does not limit the type of the operating parameter adjusting element 2213. As shown in FIG. 4, in normal operation, the first side of the sensing unit 221 corresponds to the front side of the sensing lamp which is towards the +X direction. The second side of the sensing unit 221 corresponds to the back side of the sensing light which is towards the −X direction. However, the relative positions between the first side and the second side can be changed according to the practical requirement of the design, and this shouldn't be a limitation to the present disclosure.

Figure 6:
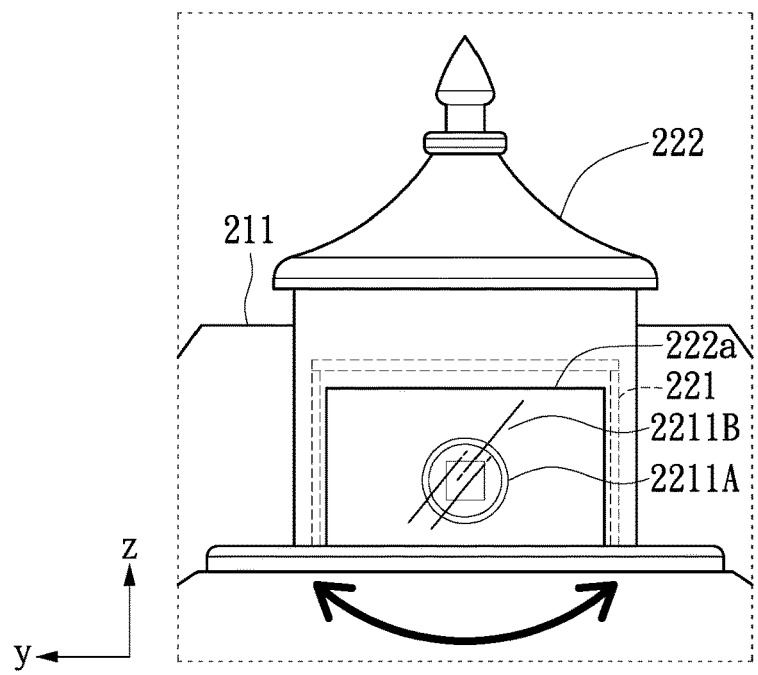
FIG. 6 shows a schematic diagram of a sensing lamp in normal status according to an embodiment of the present disclosure.
Figure 8:
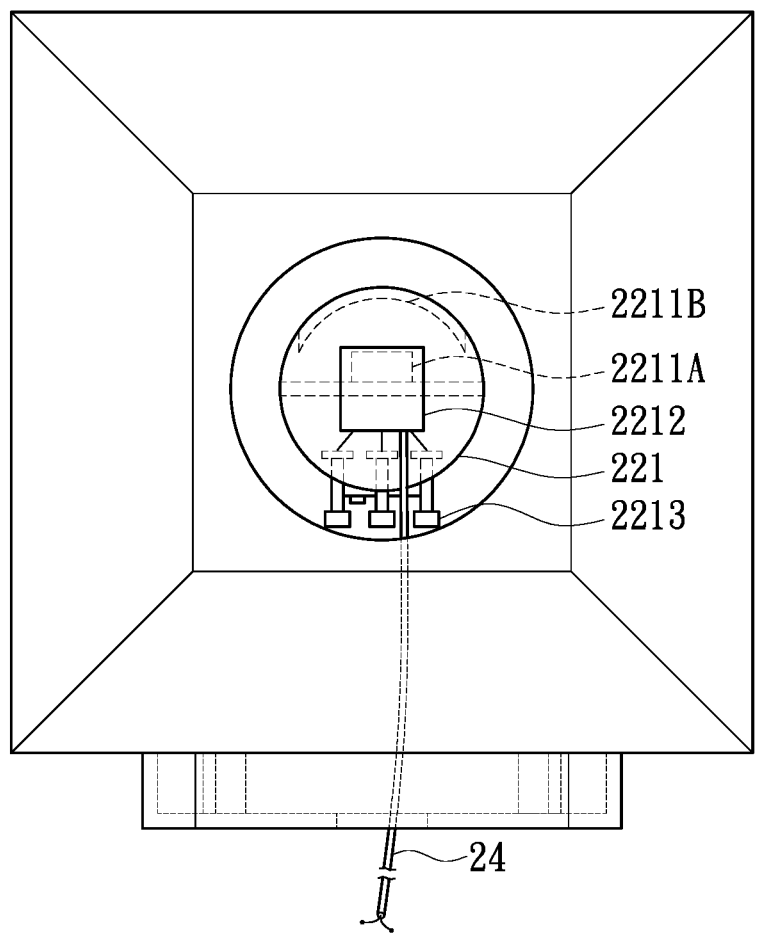
FIG. 8 shows a top view drawing of a sensing lamp according to an embodiment of the present disclosure.

Please refer to FIG. 6 in conjunction with FIG. 8. FIG. 6 shows a schematic diagram of a sensing lamp in normal status according to an embodiment of the present disclosure, and FIG. 8 shows a top view drawing of a sensing lamp according to an embodiment of the present disclosure. In FIG. 8, the cover 222 is removed, for ease of explanation and indication of the sensing unit 221. The control circuit 2212 is disposed in the sensing unit 221. The cover 222 partially covers the sensing unit 221. The cover 222 is combined with the light body 21 for partially covering the sensing unit 221.

In this embodiment, an infrared sensing unit or a light sensing unit is taken as the example of the sensing unit 221, but the present disclosure is not so restricted. The sensor 2211 comprises at least one sensing element and a lens. For example, the sensor 2211 comprises at least one sensing element 2211A and a lens 2211B. The sensing element 2211A is electrically coupled to the control circuit 2212. The lens 2211B is disposed in front of the sensing element 2211A. The lens 2211B and the sensing element 2211A can be an integral structure. The material and the shape of the lens 2211B is not limited, and can be determined based on the type of the sensor. When the sensing unit 221 is an infrared sensing unit, the sensing element 2211A is an infrared sensing element, and the lens 2211B is an infrared lens. When the sensing unit 221 is a light sensing unit, the sensing element 2211A is a light sensing element, and the lens 2211B is a normal optical lens. In another embodiment, when the sensing unit 221 is a microwave sensing unit, the sensor 2211 is replaced by a microwave sensor comprising at least one microwave antenna, and the antenna is electrically coupled to the control circuit 2212, wherein the microwave sensor receives the microwave reflected by people (or object).

Corresponding to the sensor 2211, the cover 222 has an opening portion 222a. When the sensing unit 221 is rotated to a first angle, the sensor 2211 (especially the sensing element 2211A) corresponds to the opening portion 222a of the cover 222. In other words, the sensing element 2211A is behind the lens 2211B (when the sensing unit 221 is rotated to the first angle in normal operation). In normal operation, the sensing element 2211A receives sensing signals such as the exterior light, infrared or microwave reflections through the lens 2211B. The type of received sensing signal depends on the type of the sensor 2211 (or the sensing unit 221). At this time, the operating parameter adjusting element 2213 is at the back of the sensing unit 221.

Specifically, the sensing unit 221 and the light body 21 are rotatably connected. For example, the sensing unit 221 is connected to a rotation axis (and the rotation axis is connected to the light body), or the sensing unit 221 can be disposed on a rail on the light body 21. As such, the sensing unit 221 can rotate relative to the light body 21. In practical applications, a rotation angle limit is set to limit the sensing unit 221 rotating relative to the light body 21, in order to avoid breaking the power wires (such as the power wires 24 shown in FIG. 5) connecting the sensing unit 221 and the exterior electrical power source due to twisting the power wires when the rotation angle is too large.

As shown in FIG. 4, the sensing unit 221 can rotate about the Z axis, and the sensing unit 221 can rotate to a first angle and a second angle. However, this present disclosure does not limit the central axis which the sensing unit 221 rotates about to be the Z axis. The central axis about rotation can be changed to other directions. In this embodiment, the first angle corresponds to a normal operation status. As shown in FIG. 4, the Z axis is taken as the rotation central axis, and the first angle is towards the positive direction of the X-axis (+X), such that the sensing unit 221 can sense signals such as the exterior light, infrared or microwave reflections through the lens 2211B. In one embodiment, for outdoor applications, when the sensing unit 221 is rotated to the first angle, the sensor 2211 and the cover 222 can further form an enclosed space 2220 to cover the control circuit 2212 and the operating parameter adjusting element 2213. Therefore, waterproof and dustproof efficacy can be achieved.

Figure 7:
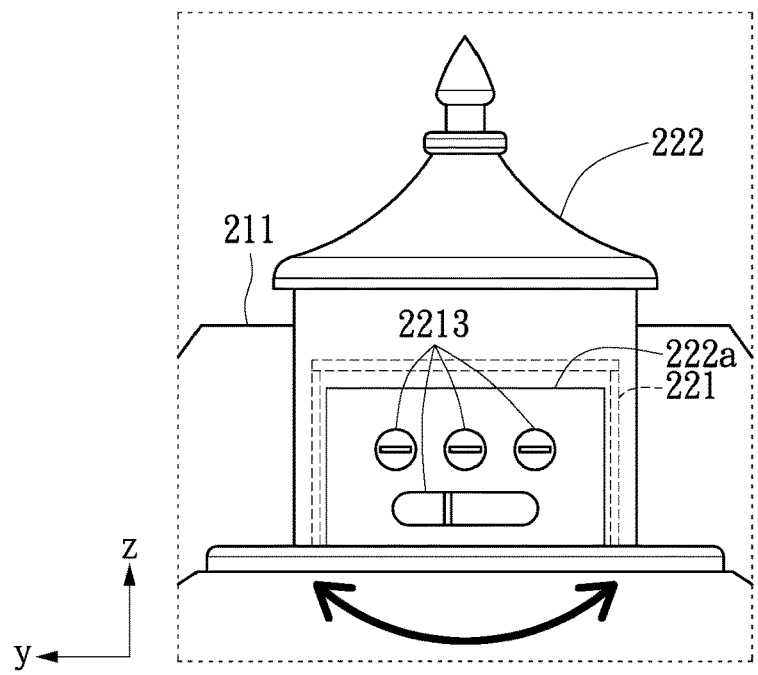
FIG. 7 shows a schematic diagram of a sensing lamp in adjustment status according to an embodiment of the present disclosure.

Please refer to FIG. 7 showing a schematic diagram of a sensing lamp in adjustment status according to an embodiment of the present disclosure. The second angle corresponds to an adjustment status. Consider the Z-axis shown in FIG. 4 as the rotation central axis, and the second angle towards the negative direction of X-axis (−X). When the sensing unit 221 is rotated to the second angle (towards −X), at least one operating parameter adjusting element 2213 is exposed, for the convenience of the user to manually adjust the operating parameter adjusting element 2213. At this time, because the sensing unit 221 is rotated to the second angle, the sensor 2211 (comprising the lens 2211B and the sensing element 2211A) is covered by the cover 222. In FIG. 7, as an exemplary embodiment, the shown operating parameter adjusting elements 2213 are three knobs and a slide switch.

In other words, when the sensing unit is rotated to the first angle (+X) which is for the normal operation status, the sensor 2211 at the first side of the sensing unit 221 is not covered by the cover 222. When the sensing unit 221 is rotated to the second angle (−X), the operating 2213 at the second side of the sensing unit 221 is not covered by the cover 222.

In practical applications, the first side can be the front-side (positive direction of the X-axis shown in FIG. 4), the second side can be the back-side (negative direction of the X-axis shown in FIG. 4), that is the sensor 2211 and the operating parameter adjusting element 2213 are respectively provided to the front-side and the back-side of the sensing unit 221. In the embodiment shown in FIG. 4, the difference between the first angle and the second angle can be 180 degrees, but the present disclosure is not so restricted. In another embodiment, the first side and the second side can be other than the front-side and the back-side respectively. Based on the design requirement, the angle difference between the first side and the second can be less than 180 degrees, for example, the difference between the first angle and the second angle can be at least 90 degrees. That is, the difference between the first angle and the second angle can be varied or altered according to the practical requirement of the design. For example, the difference between the first angle and the second angle can be adjusted to an angle between 90 degrees and 180 degrees according to the practical requirement of the design. Alternatively, the difference between the first angle and the second angle can be less than 90 degrees.

Another Embodiment of the Sensing Lamp

Figure 9:
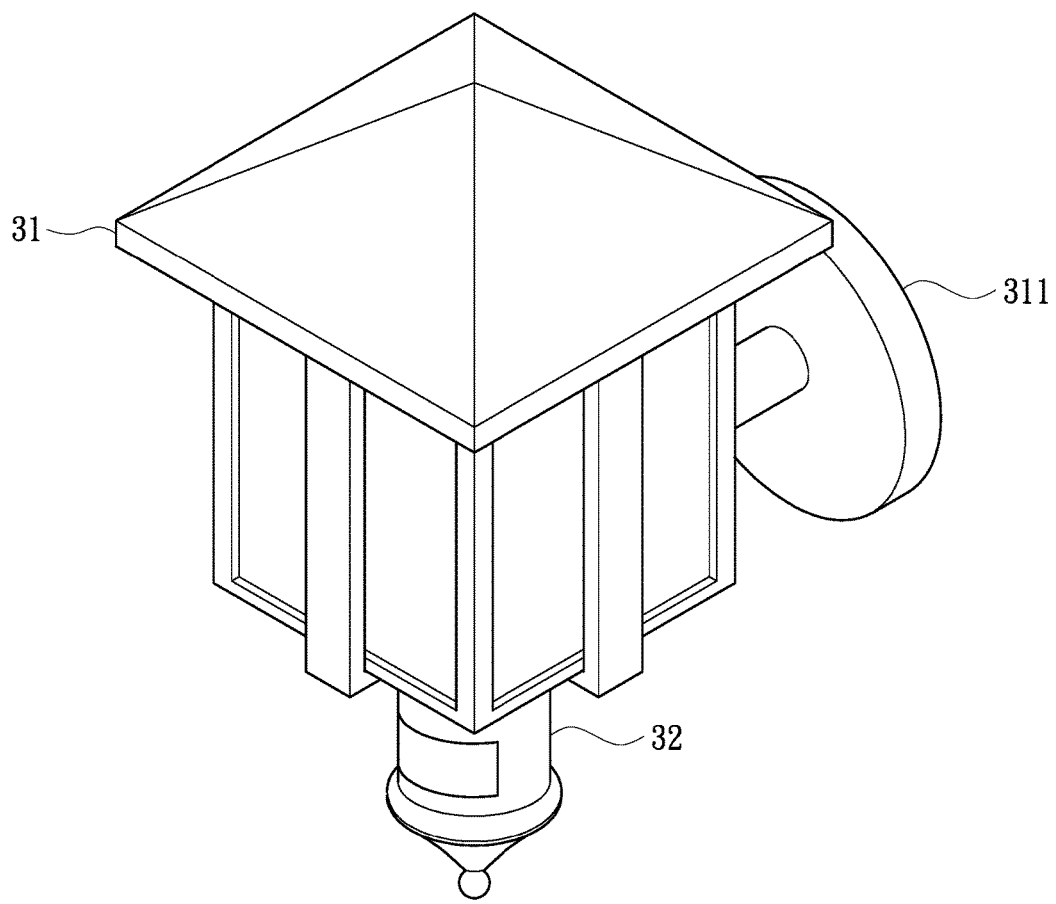
FIG. 9 shows a schematic diagram of a sensing lamp according to another embodiment of the present disclosure.

Please refer to FIG. 9 showing a schematic diagram of a sensing lamp according to another embodiment of the present disclosure. Compared to the embodiment shown in FIG. 4, the sensing module 32 of the sensing lamp 3 is changed to be connected to the bottom of the light body 31. Other components of the sensing lamp 3 are similar to the sensing lamp 2 shown in FIG. 4. For example, the difference between the back plate 311 and the back plate 211 shown in FIG. 4 is only that the shape of the back plate is different, that is to say that the back plate of the sensing lamp 3 can be arbitrarily changed according to practical applications. The sensing module 32 can comprise an infrared sensing unit, a microwave sensing unit, a light sensing unit, or any combination thereof, but the present disclosure is not so restricted. The sensing module 32 of the sensing lamp 3 is regarded as placing the sensing module 22 of FIG. 4 upside down, and the structure and the circuit function of the sensing module 32 are identical to those of the sensing module 22, thus the redundant information is not repeated.

Another Embodiment of the Sensing Lamp

Figure 10:
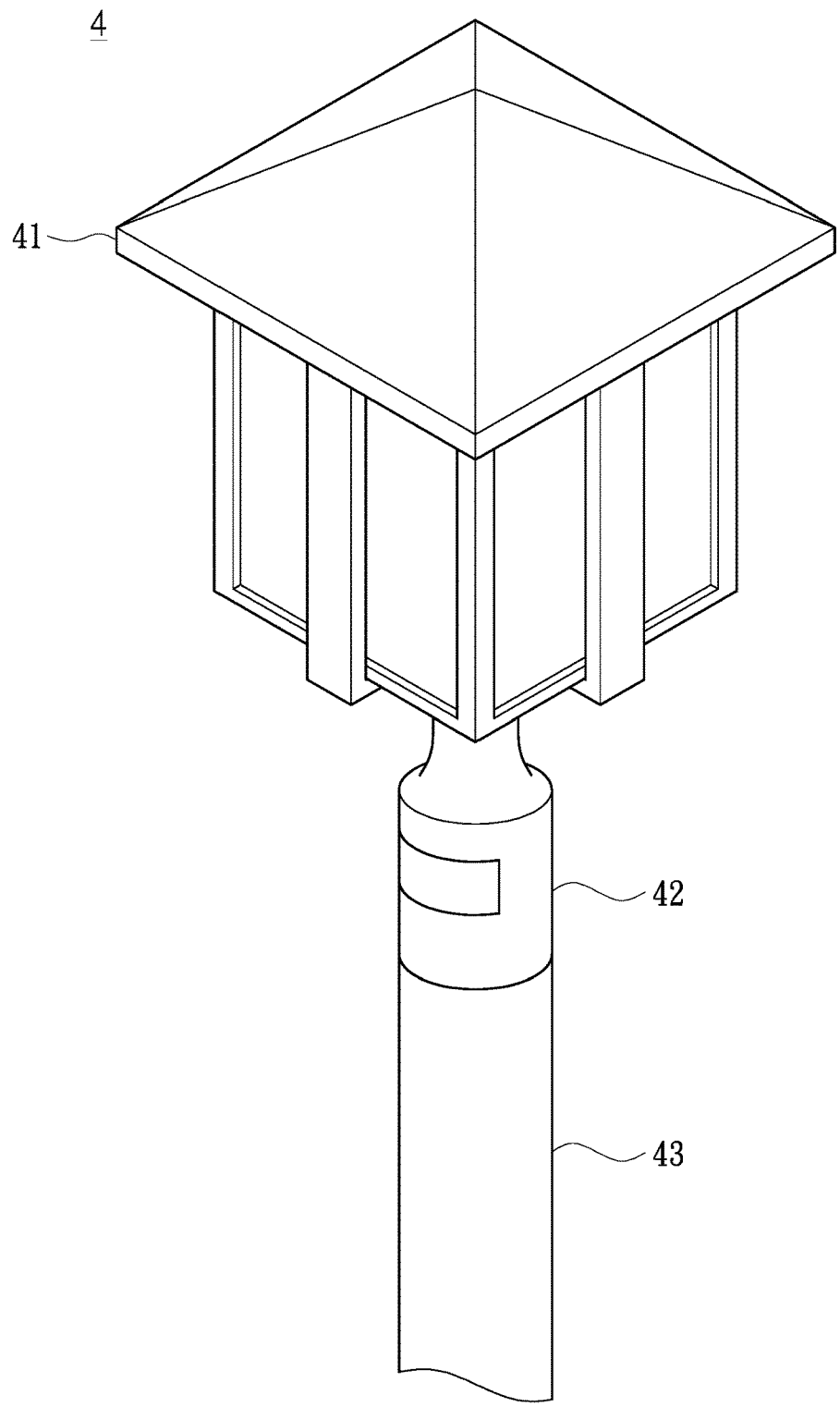
FIG. 10 shows a schematic diagram of a sensing lamp according to another embodiment of the present disclosure.

Please refer to FIG. 10 showing a schematic diagram of a sensing lamp according to another embodiment of the present disclosure. Compared to the embodiment shown in FIG. 9, the sensing module 42 of the sensing lamp 4 is also arranged at the bottom of the light body 41. However, compared to the sensing lamp 3 as shown in FIG. 9, the sensing lamp 4 in FIG. 10 is a roadside lamp 4. Thus, the back plate is removed, and a supporting pole 43 is added. Other components of the sensing lamp 4 are similar to those of the sensing lamp 2 shown in FIG. 4. The sensing module 42 can comprise an infrared sensing unit, a microwave sensing unit, a light sensing unit, or any combination thereof, but the present disclosure is not so restricted. The sensing module 42 of the sensing lamp 4 is regarded as placing the sensing module 22 of FIG. 4 at a proper position, and the structure and the circuit function of the sensing module 42 are identical to those of the sensing module 22, thus the redundant information is not repeated. In another one embodiment, when the type of application of the sensing lamp 4 is changed, for example, a chandelier, ceiling lamp or other kinds of lamp, the position and the detecting direction (angle or range) of the sensing module can be changed according to the requirement. In short, the present disclosure does not limit the type of the sensing module, the appearance of the sensing module and the position of the sensing module. Also, the present disclosure does not limit the sensing angle or range of the sensing module.

Another Embodiment of the Sensing Lamp

Figure 11:
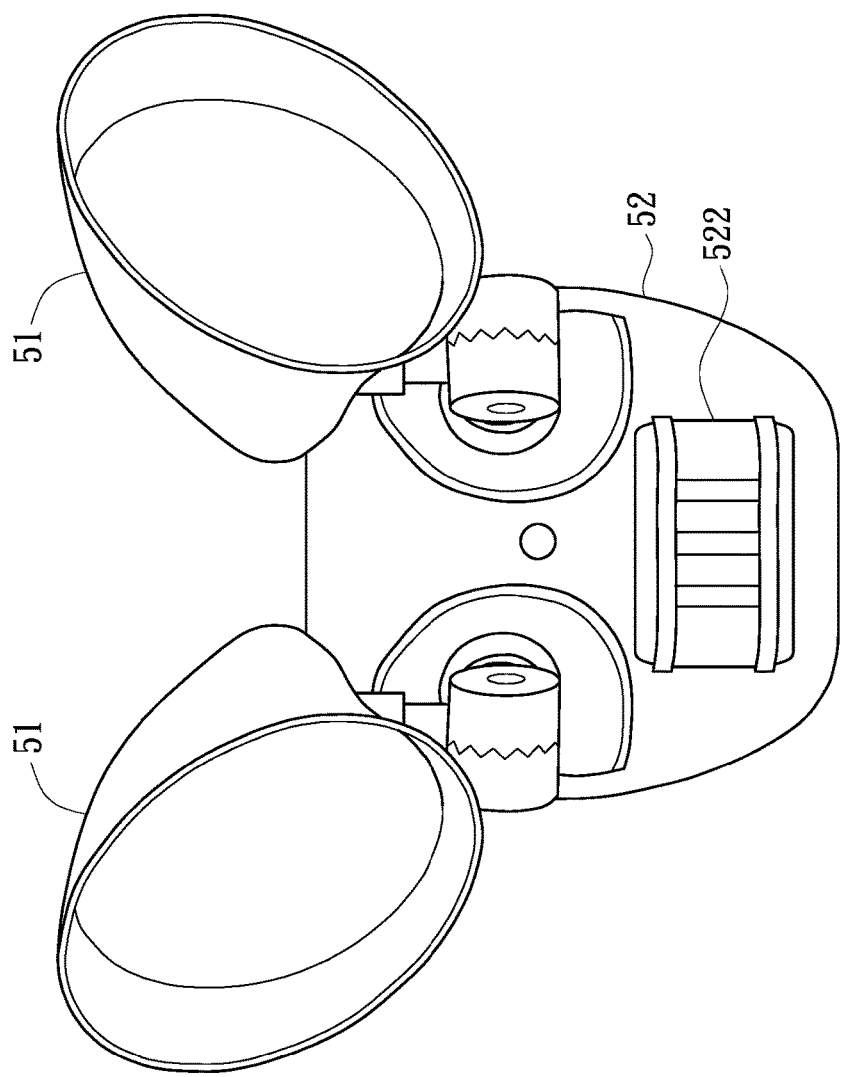
FIG. 11 shows a schematic diagram of a sensing lamp according to another embodiment of the present disclosure.

Please refer to FIG. 11 showing a schematic diagram of a sensing lamp according to another embodiment of the present disclosure. The sensing module 522 is not disposed on the light body 51, but on the back plate 52. In other words, the major difference between the sensing lamp 5 and the previous embodiments is the sensing module 522 is disposed on the back plate 52. The sensing unit (not shown in FIG. 11, referring to the sensing unit 221 shown in FIG. 4) of the sensing module 522 rotatably connects to the back plate 52. Additionally, the sensing lamp 5 shown in FIG. 11 comprises two light bodies 51, but the appearance of the sensing lamp 5 is not for restricting the scope of the present disclosure. The sensing module 522 can comprise an infrared sensing unit, a microwave sensing unit, a light sensing unit, or any combination thereof, but the present disclosure is not so restricted. The design concept of the sensing module 522 is identical to that of the sensing module 22, that is to say the design concept of the operating parameter adjusting element of the sensing module 522 is identical to the operating parameter adjusting element 2213 of the previous embodiment, thus the redundant information is not repeated.

According to the above descriptions, the provided sensing lamp integrates the sensor and the control circuit into the sensing module. As such, the wiring layout is simple, the arrangement of control wires or power wires is simplified, and the related cost of production of the lamp product and the probability of defects resulting during production process can be reduced. The sensing lamp is provided with a user-friendly way for adjustment, as well as more concise and aesthetic appearance (the operating parameter adjusting element is concealed). By utilizing the rotatable sensing unit of the sensing lamp, the user can easily rotate the sensing unit to an angle (the second angle) adapted for operating the operating parameter adjusting element(s), so as to adjust the related operating parameter of the sensing unit. After the adjustment is finished, the sensing unit can return to the normal operation angle (first angle). Because the back plate of the sensing lamp is not restricted to incorporate the operating parameter adjusting element(s), the design flexibility is significantly increased when considering the back plate to match the aesthetic appearance of the overall light body.

An Embodiment of the Sensing Module

Figure 12A:
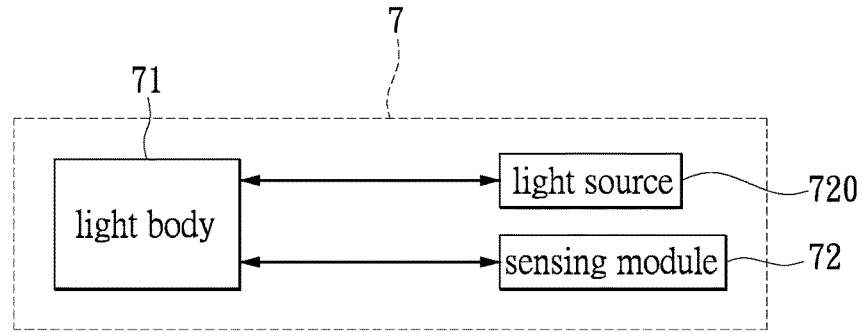
FIG. 12A shows a schematic detachability diagram of a sensing module with a sensing lamp according to another embodiment of the present disclosure.
Figure 13A:
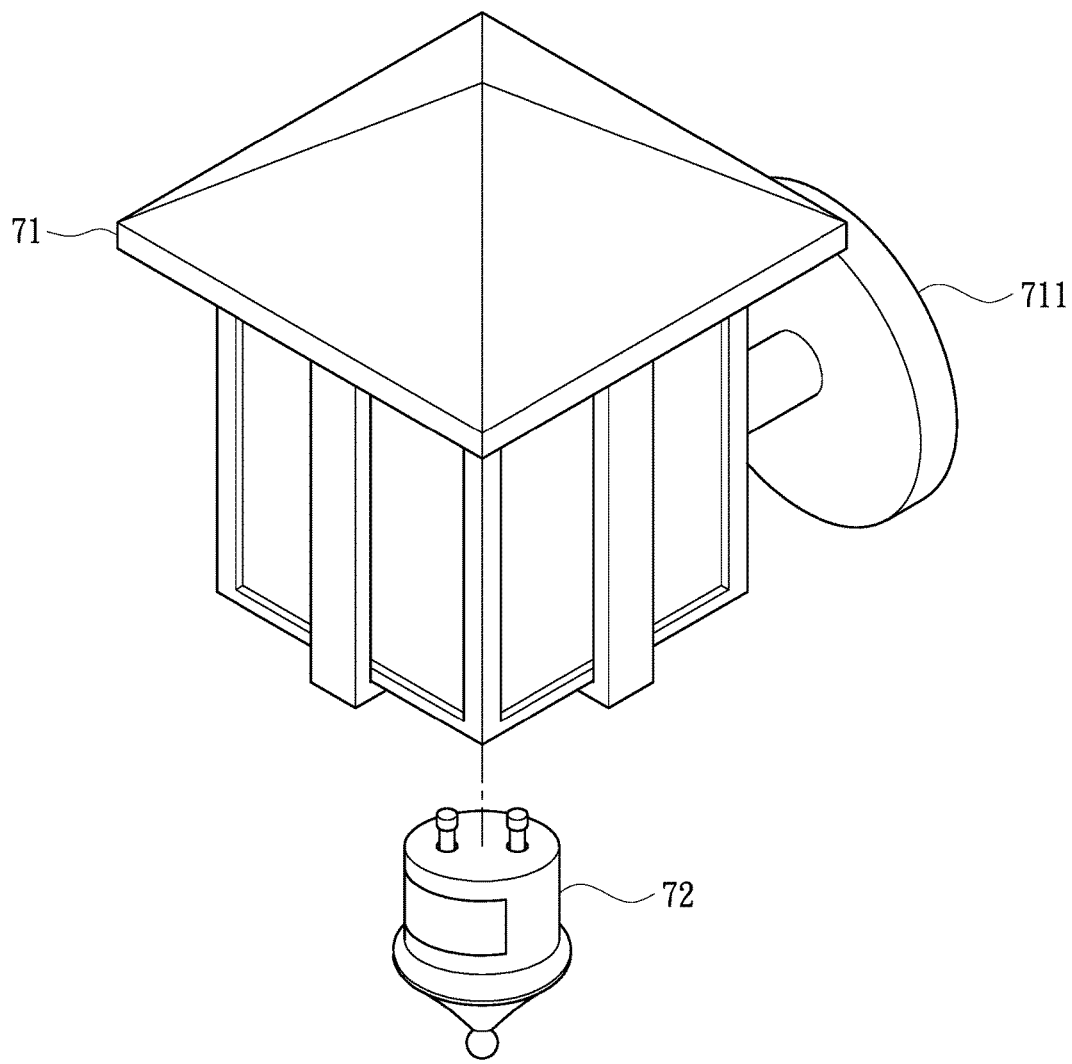
FIG. 13A shows an assembled view of the sensing module with a sensing lamp according to FIG. 12A of the present disclosure.
Figure 13B:
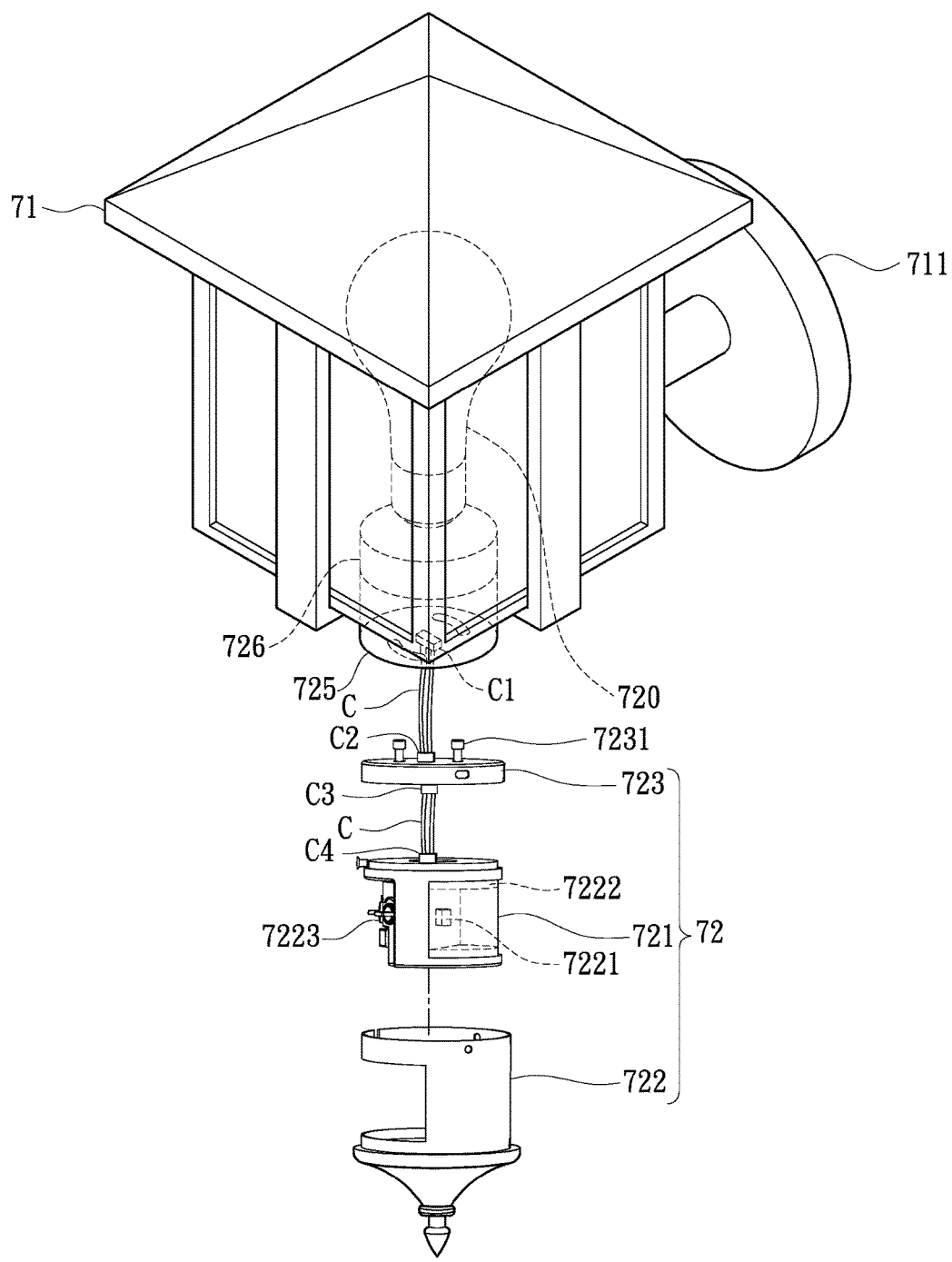
FIG. 13B shows an exploded view of the sensing module with a sensing lamp according to FIG. 12A of the present disclosure.

Please refer to FIGS. 12A, 13A, and 13B, which show a schematic detachability diagram, an assembled view and an exploded view of a sensing module of a sensing lamp 7 according to another embodiment of the present disclosure. The sensing lamp 7 includes a light body 71, a sensing module 72 and a light source 710. The light body 71 is fixed on the wall by a back plate 711. The sensing module 72 is detachably connected to the light body 71 to selectively turn on the light source 720. According to this diagram, both the sensing module 72 and light source 720 can be detachably and independently attached on the sensing lamp 7. As shown in FIG. 13B, the sensing module 72 includes a sensing unit 721 and a connecting module 723. A holder connector 725 is a corresponding element in the light body 71. The sensing unit 721 has at least one sensor 7221, a control circuit 7222 and at least one operating parameter adjusting element 7223. The sensing unit 721 and the bottom cover perform the similar functions as described in the previous disclosure. The sensor 7221 can be a microwave sensor. The operating parameter adjusting element 7223 can be used to adjust illumination characteristics of the light source, such as a light intensity, a timer, and a sensor sensitivity, etc. The at least one sensor 7221 and the at least one operating parameter adjusting element 7223 are electrically coupled to the control circuit 7222. A first side of the sensing unit 721 is provided with the sensor 7221. A second side of the sensing unit 721 is provided with the operating parameter adjusting element 7223. The control circuit 7222 is disposed in the sensing unit 721.

The connecting module has a pair of electrodes 7231 that can be detachably inserted and locked into a corresponding receptacle in the light body 71. When electrodes 7231 are attached to light body 71, the sensing unit 721 receives the power supply from the power source of the light body 71 through the electrodes 7231. The electrodes 7231 are electrically connected to the sensing unit 721. The sensing module 72 is detachably connected with the light body 71 via the connecting module 723 and the holder connector 725. The electrodes 7231 are electrically coupled with the light body 71 when the connecting module is connected with the light body 71.

Refer to FIG. 13B. A socket connector 726 is disposed in the light body 71, which can be an E27 type lamp socket in this embodiment. The connecting module 723 and the holder connector 725 allow the sensing module 72 electrically connecting with the light body 71.

In this embodiment, the holder connector 725 is fixed in the light body 71 and the connecting module is a rotatory plunger is electrically coupled to the sensor 7211. The rotatory plunger is connected to the sensing unit 721. The electrodes 7231 are provided with the rotatory plunger. For example, in this embodiment, the rotatory plunger can be a bi-pin connector, a screw socket or a GU24 connector. The bi-pin connector, sometimes referred to as two-pin, bi-pin cap or bi-pin socket, is a standard from the IEC (International Electro-technical Commission) for lamp fittings. These are used on many small incandescent light bulbs (especially halogen lamps), and for starters on some types of fluorescent lights as well, such as a GU10 twist-lock base. The screw socket, or referred to as Edison screw (ES), is a standard socket for light bulbs, such as E14 or E27 screw base. The GU24 connector is fitting for compact fluorescent light bulbs (CFL) or LED bulbs that use a bayonet mount-like twist-lock bi-pin connector instead of the Edison screw fitting used on many incandescent light bulbs.

This embodiment further includes a cable C between the sensing unit 721 and the holder connector 725. The cable C passes through the rotatory plunger 723. The cable C can include a ground wire, a power wire, a zero cross detection wire and a control-driving wire. However, the present disclosure is not limited thereto, for example, the cable C can be replaced by connecters, such as connecter C1 and connecter C2 without cable, or connecter C3 and connecter C4 without cable. Each connector can have a plurality of pins, such as a ground pin, a power pin, a zero cross detection pin and a control-driving pin.

The sensing module 72 further includes a cover 722 partially covers the sensing unit 721. The sensing unit 721 and the light body 71 are rotatably connected, so that the sensing unit 721 is capable of rotating to a first angle and a second angle. The sensor 7211 at the first side of the sensing unit 7211 is not covered by the cover 722 when the sensing unit 721 is rotated to the first angle. The operating parameter adjusting element 7223 at the second side of the sensing unit 721 is not covered by the cover 722 when the sensing unit 721 is rotated to the second angle.

Another Embodiment of the Sensing Module

Figure 12B:
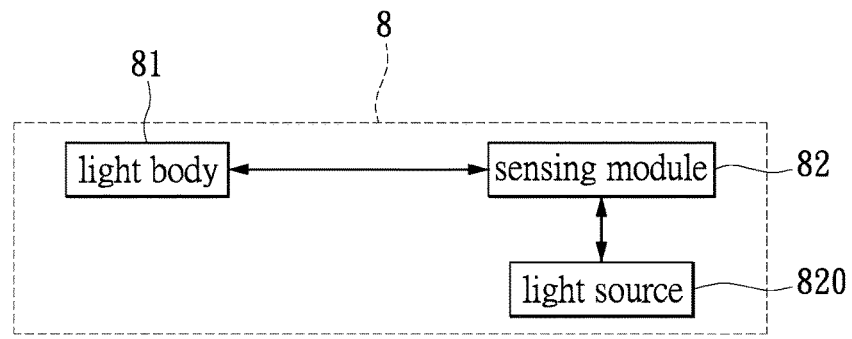
FIG. 12B shows a schematic detachability diagram of a sensing module with a sensing lamp according to another embodiment of the present disclosure.
Figure 14:
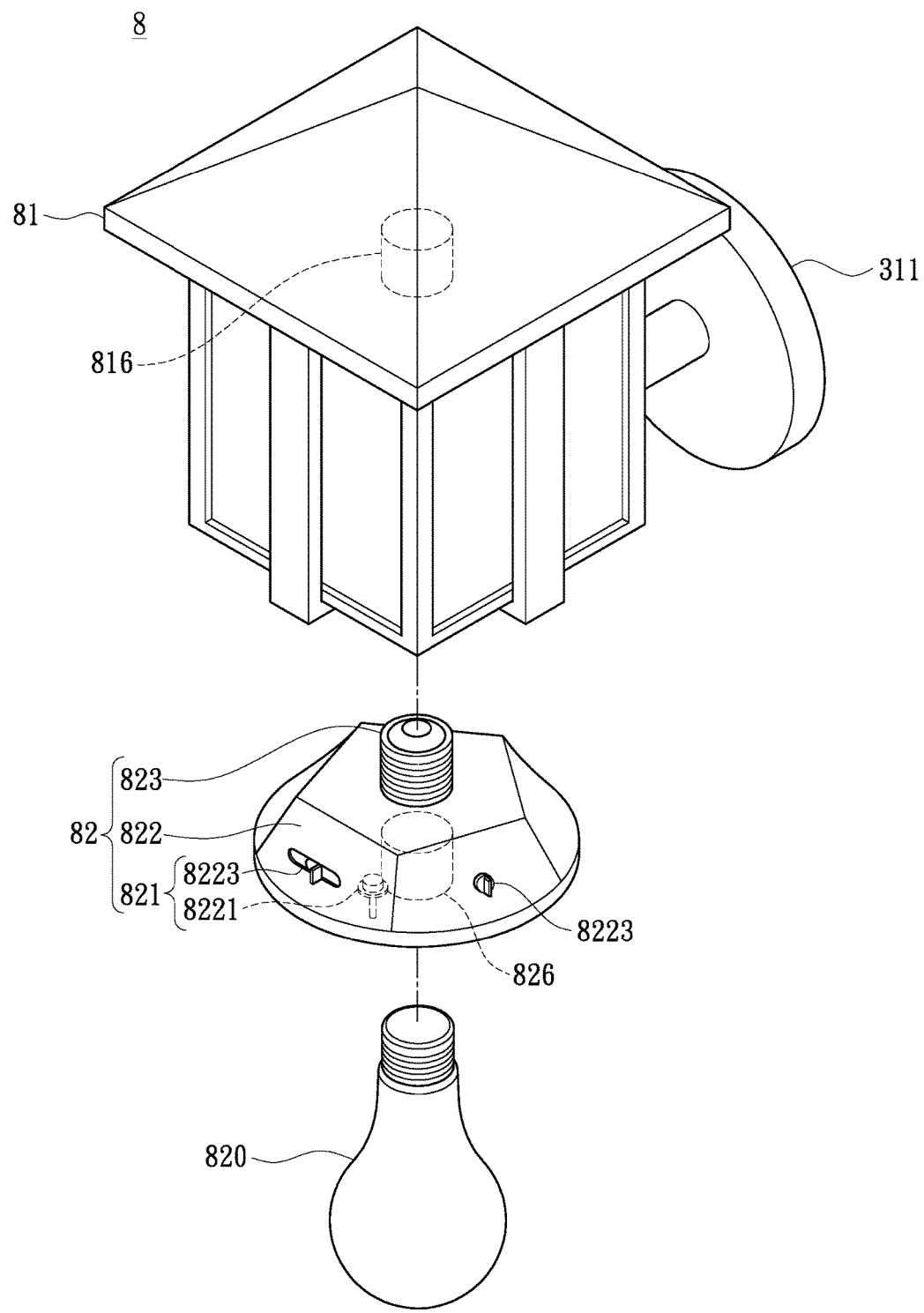
FIG. 14 shows an exploded view of the sensing module with a sensing lamp according to FIG. 12B of the present disclosure.

Please refer to FIG. 12B and FIG. 14, which show a schematic detachability diagram and an exploded view of a sensing module of a sensing lamp 8 according to another embodiment of the present disclosure. A sensing module is detachably connectable to a light body 81. The sensing lamp 8 includes a light body 81, a sensing module 82 and a light source 820. According to this diagram, the light source 820 can be detachably attached to the sensing module 82. The sensing module 82 is further detachably attached to the sensing lamp 8.

Please refer to FIG. 14 showing the detail implementation of FIG. 12B. The sensing module 82 performs the same function as that of sensing module 72 in FIG. 12A. The difference is that the housing 822 has a screw-in base on the top and a screw-in socket in the bottom. The screw-in base and the screw-in socket allow the sensing module 82 to make both electrical and mechanical connections when being attached to the light body 81 and the light source 820 through the corresponding screw-in base and the screw-in socket.

The sensing module 82 includes a sensing unit 821, and a housing 822 to receive the sensing unit 821. The sensing unit 821 includes at least one sensor 8211 which can be a microwave sensor, a control circuit (inside the housing 822) and at least one operating parameter adjusting element 8223. The sensor 8211 and the operating parameter adjusting element 8223 electrically coupled to the control circuit. The light source 820 is capable of be turned on by the sensing unit 82 selectively. The sensing module 82 is detachable connected to the light body 81 by a first holder connector 816, and the light source 820 is detachable connected to the sensing module 82 by a second holder connector 826. The holder connectors (816, 826) can be a bi-pin connector, a screw-in socket or a GU24 connector.

A connecting module 823 is electrically coupled with the sensing unit 821 and fixed above the sensing unit 821. In this embodiment, the connecting module 823 is fixed on a top of the housing 822. The connecting module 823 allows the sensing module 82 electrically connectable with the light body 81. The connecting module 823 can be detachably fixed in the light body 81. The connecting module 823 can be screw-in base, a bi-pin base or a GU24 base.

Another Embodiment of the Sensing Module

Figure 12C:
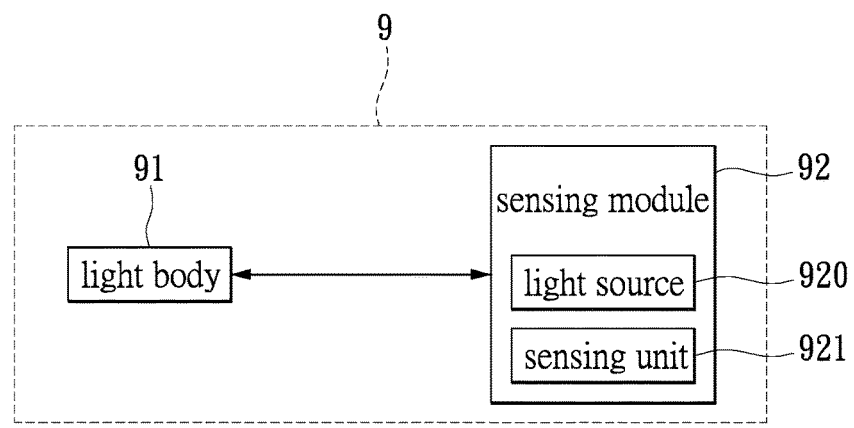
FIG. 12C shows a schematic detachability diagram of a sensing module with a sensing lamp according to another embodiment of the present disclosure.
Figure 15:
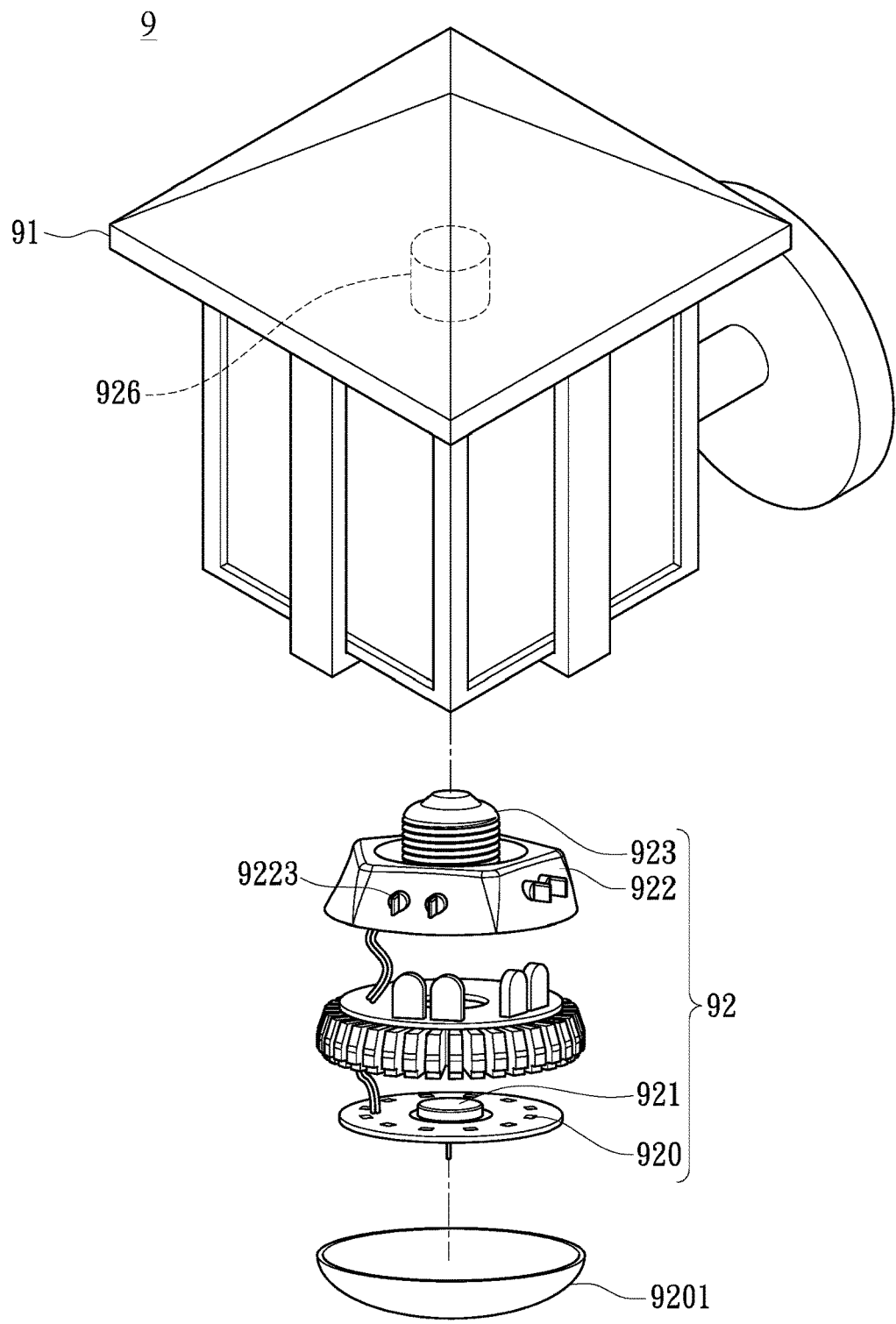
FIG. 15 shows an exploded view of the sensing module with a sensing lamp according to FIG. 12C of the present disclosure.

Please refer to FIG. 12C and FIG. 15, which show a schematic detachability diagram and an exploded view of a sensing module of a sensing lamp 9 according to another embodiment of the present disclosure. FIG. 15 showing the detail implementation of FIG. 12D. The sensing lamp 9 includes a light body 91 and a sensing module 92. The sensing module 92 includes a light source 920 and a sensing unit 921. According to this diagram, the sensing module 92 can be detachably attached to the sensing lamp 9 using similar structure described in the previous embodiment of FIG. 14.

The difference of the sensing module 92 from the sensing module 82 in FIG. 14 is that the sensing module 92 further integrates the light source 920 in the sensing module. With all components including sensing unit, comprehensive operating parameter adjustments as well as the light source integrated into one module and further is detachably connectable to a light body through a screw-in base make this sensing module user-friendly, applicable to most of the decoration lantern and cost economic. The light source 920 is a LED light. The sensing unit 921 is disposed on a bottom surface of the LED light. The light source 920 is either detachably or non-detachably connected under the housing 922.

To summarize and conclude the aforementioned descriptions the present invention discloses a user friendly solution for operating a wall lamp by relocating a control module of the wall lamp from a conventional arrangement of installing the control module in a mounting bracket located behind a light body to an easy-access location integrated with the light body in the front such that a user can easily adjust at least one operating parameter to manage a lighting performance of the wall lamp. The control module may be configured with a rotatable control unit and a cover or may be configured with a control unit and a rotatable cover to achieve the same effect. In a first configuration, the control unit is rotatable against its own central axis such that an operating parameter adjusting element of the control module can be rotated to an easy-access location for making an adjustment. In a second configuration, the control module is fixed and the cover is designed with a first opening for exposing the operating parameter adjusting element. The first opening is further covered by an openable device to cover or uncover the operating parameter adjusting element for making an adjustment. The openable device may be designed with a slide gate to be operated in conjunction with a circular track or a circular slot built with the cover such that the slide gate is movable along the circular track or the circular slot to rotate against the central axis of the control module. When the slide gate is rotated to a first angle position, the operating parameter adjusting element is fully covered by the slide gate to protect against any damage caused by any external factor. When the slide gate is rotated to a second angle position, the operating parameter adjusting element is uncovered and is exposed to being adjusted. When the control unit includes at least one operating parameter adjusting element and at least one sensor, the cover can be further designed with a second opening for exposing the at least one sensor to a detection space for performing a detection function. Further the cover may be divided into a rotatable first portion and a non-rotatable second portion to respectively accommodate the operating parameter adjusting element and the at least one sensor, wherein the second portion of the cover is designed with an opening for exposing the at least one sensor to the detection space and the first portion of the cover is rotatable against the second portion of the cover through a thread structure. When the first portion of the cover is rotated to a first angle position, the first portion of the cover is thereby fastened with the second portion of the cover through the thread structure. When the first portion of the cover is rotated to a second position, the first portion of the cover is detachably removable from the second portion such that the operating parameter adjusting element is exposed to being adjusted.

The drawings from FIG. 16A through FIG. 20B serve to schematically describe various applications of the present disclosure featured with a common feature of exposing an operating parameter adjusting element to being conveniently adjustable by a user through a rotation arrangement. To simplify the illustration same part numbers are shared in each of the drawings.

FIG. 16A and FIG. 16B are schematic views of a sensing wall light 2a configured with a control module 22 integrated with a light body 21. The control module 22 includes a rotatable sensing unit 221 and a cover 222, wherein the cover 222 is designed with an opening portion 222a in the front facing a detection space. The rotatable sensing unit is configured with at least one sensor 2211, a control circuit 2212, at least one operating parameter adjusting element 2213 and a space 2220 to accommodate the at least one sensor 2211, the control circuit 2212 (disposed in the center) and the at least one operating parameter adjusting element 2213. The at least one sensor 2211 and the at least one operating parameter adjusting element 2213 are electrically coupled to the control circuit respectively. The at least one sensor 2211 is disposed on one side of the rotatable sensing unit 221 and the at least one operating parameter adjusting element 2213 is disposed on the opposite side of the rotatable sensing unit 221. When the rotatable sensing unit 221 is rotated to a first angle position, as FIG. 16A shown, the at least one sensor 2211 is located inside the opening portion 222a and is exposed to the detection space for performing a sensing function. When the rotatable sensing unit 221 is rotated to a second angle position, as FIG. 16B shown, the at least one operating parameter adjusting element 2213 is located in the opening portion 222a and is exposed to being adjusted.

Figure 17B:
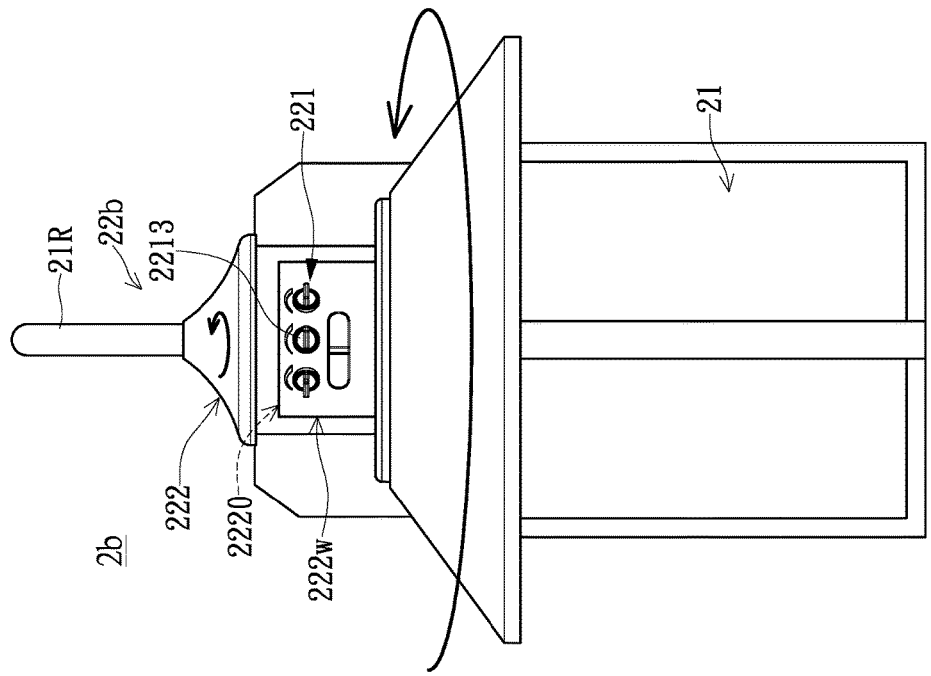
FIG. 17B shows a front view of the sensing lamp in an adjustment status by rotating the light body of FIG. 17A of the present disclosure.
Figure 17A:
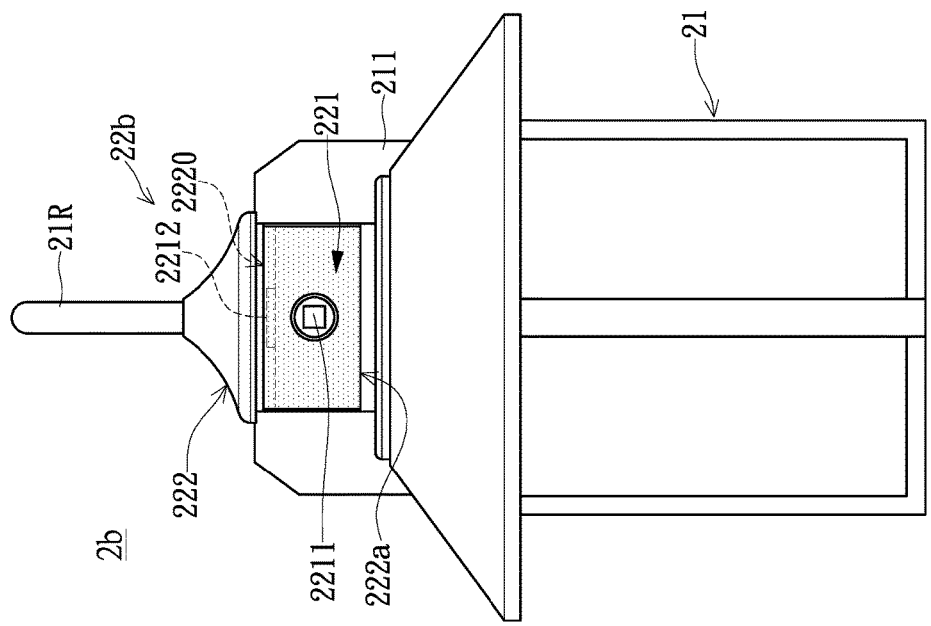
FIG. 17A shows a front view of the sensing lamp with a rotatable light body in a normal status according to FIG. 4 of the present disclosure.

FIG. 17A and FIG. 17B are schematic views of a sensing wall lamp 2b configured with a control module 22b integrated with the light body 21. An arm 21R has a front end, and a rear end fixed to a back plate 211. The light body 21 and the control module 22b are rotatably connected to the front end of the arm 21R. The control module 22b is rotatable against its own central axis through a rotation structure. The control module 22b includes a sensing unit 221 and a cover 222. The sensing unit 221 includes at least one sensor 2211, at least one operating parameter adjusting element 2213, a control circuit 2212 and a space 2220 to accommodate the at least one sensor 2211, the at least one operating parameter adjusting element 2213 and the control circuit 2212. The at least one sensor 2211 and the at least one operating parameter adjusting element 2213 are electrically coupled with the control circuit respectively. The at least one sensor 2211 is disposed on one side of the sensing unit 221 and the at least one operating parameter adjusting element 2213 is disposed on the opposite side of the sensing unit 221. The cover 222 is designed with a first opening portion 222a to expose the at least one sensor 2211, and a second opening portion 222w to expose the at least one operating parameter adjusting element 2213. Refer to FIG. 17A. When the control module 22b in conjunction with the light body 21 is rotated to a first angle position, the sensor 2211 located inside the first opening portion 222a is rotated to a front location facing a detection space to perform a sensing function. Refer to FIG. 17B. When the control module 22b in conjunction with the light body 21 is rotated to the second angle position, the at least one operating parameter adjusting element 2213 located inside the second opening portion 222w is rotated to an easy-access location and is exposed to being conveniently adjusted.

Figure 18B:
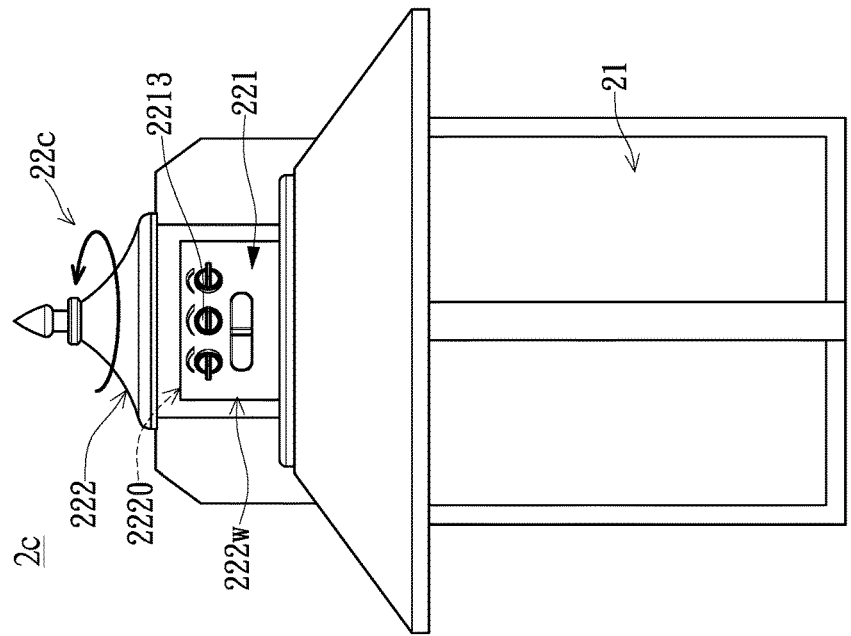
FIG. 18B shows a front view of the sensing lamp in an adjustment status according to FIG. 18A of the present disclosure.
Figure 18A:
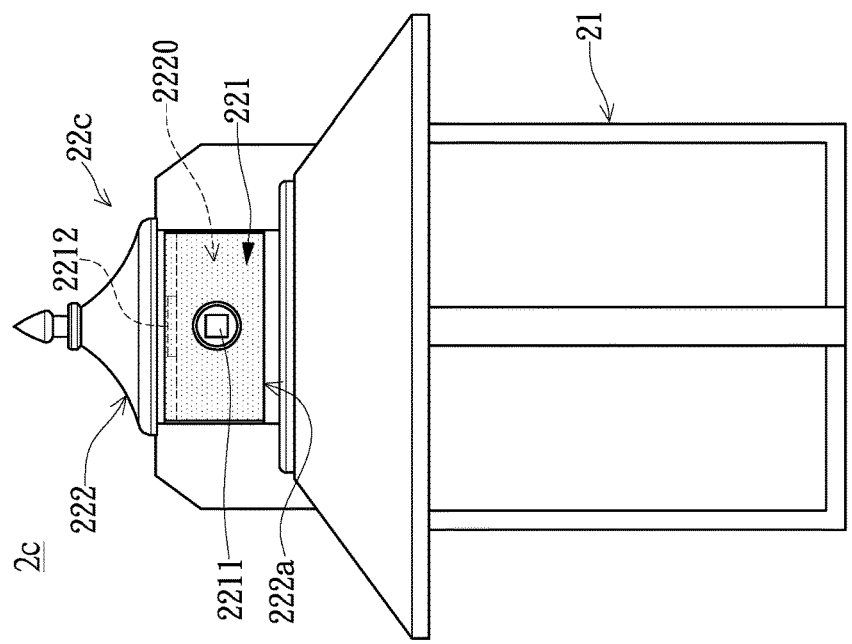
FIG. 18A shows a front view of the sensing lamp with a rotatable cover and a rotatable sensing unit in a normal status according to FIG. 4 of the present disclosure.

FIG. 18A and FIG. 18B are schematic views of a sensing wall lamp 2c configured with a control module 22c integrated with the light body 21. The control module 22c includes a sensing unit 221 and a cover 222. The sensing unit 221 includes at least one sensor 2211, at least one operating parameter adjusting element 2213, a control circuit 2212 and a space 2220 to accommodate the at least one sensor 2211, the at least one operating parameter adjusting element 2213 and the control circuit 2212. The at least one sensor 2211 and the at least one operating parameter adjusting element 2213 are electrically coupled with the control circuit 2212 respectively. The at least one sensor 2211 is disposed on one side of the sensing unit 221 and the at least one operating parameter adjusting element 2213 is disposed on the opposite side of the sensing unit 221. The cover 222 is designed with a first opening portion 222a to expose the at least one sensor 2211 and a second opening portion 222w to expose the at least one operating parameter adjusting element 2213. The control module 22c in conjunction with the cover 222 is rotatable against a central axis of the control module 22c through a rotation structure. Refer to FIG. 18A. When the control module 22c in conjunction with the cover 222 is rotated to a first angle position, the at least one sensor 2211 located inside the first opening portion 222a is rotated to a front location facing a detection space to perform a sensing function. Refer to FIG. 18B. When the control module 22c in conjunction with the cover 222 is rotated to a second angle position, the at least one operating parameter adjusting element 2213 located inside the second opening portion 222w is rotated to an easy-access location and is exposed to being conveniently adjusted.

Figure 19B:
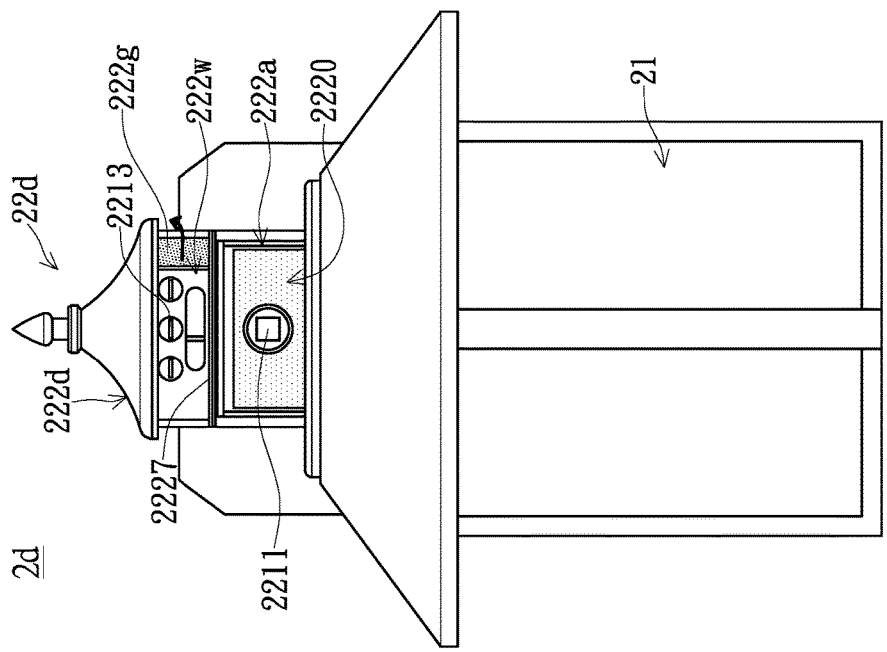
FIG. 19B shows a front view of the sensing lamp in an adjustment status according to FIG. 19A of the present disclosure.
Figure 19A:
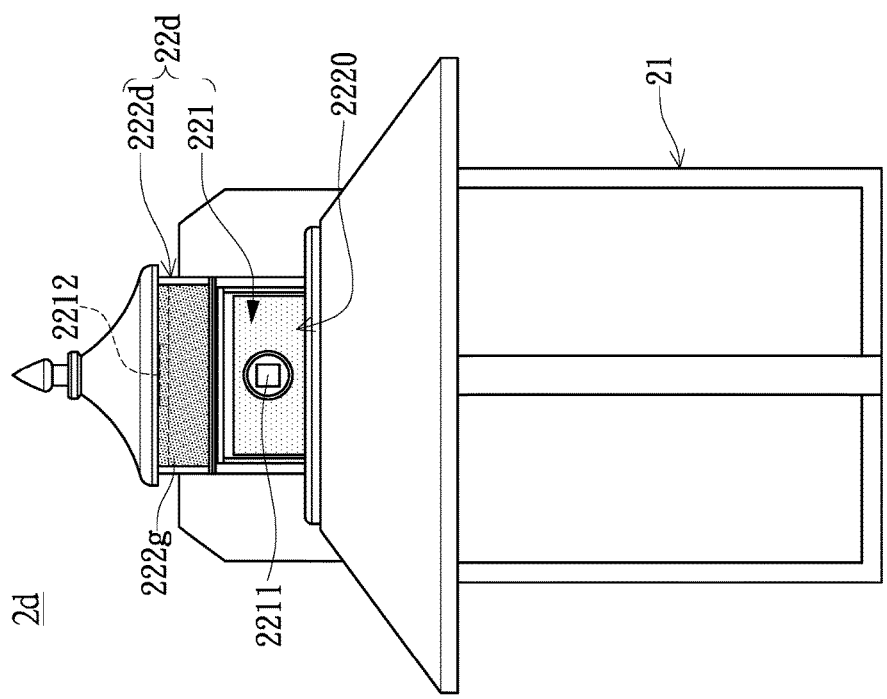
FIG. 19A shows a front view of the sensing lamp with a rotatable and openable device in a normal status according to FIG. 4 of the present disclosure.

FIG. 19A and FIG. 19B are schematic views of a sensing wall lamp 2d configured with a control module 22d integrated with a light body 21 of the sensing wall lamp 2d. The control module 22d includes a sensing unit 221 and a cover 222d. The sensing unit 221 is configured with at least one sensor 2211, at least one operating parameter adjusting element 2213, a control circuit 2212, and a space 2220 to accommodate the at one sensor 2211, the at least one operating parameter adjusting element 2213 and the control circuit 2212. The at least one sensor 2211 and the at least one operating parameter adjusting element 2213 are electrically coupled with the control circuit 2212 respectively. The at least one operating parameter adjusting element 2213 and the at least one sensor are disposed and vertically aligned on a front side of the sensing unit 221 facing a detection space. The cover 222d is designed with a first opening 222a for exposing the at least one sensor 2211 and a second opening portion 222w for exposing the at least one operating parameter adjusting element 2213. The second opening portion 222w is further covered by an openable device 222g to cover and uncover the at least one operating parameter adjusting element 2213. The openable device 222g can be a slide gate which is designed to be operated in conjunction with a circular track (or a circular slot) 2227. The slide gate is movable along the circular track (or the circular slot) 2227 to rotate against a central axis of the control module 22d. Refer to FIG. 19A. When the slide gate is rotated to a first angle position, the at least one operating parameter adjusting element 2213 is fully covered by the slide gate to protect the at least one operating parameter adjusting element 2213 against any damage caused by any external factor. Refer to FIG. 19B. When the slide gate is rotated to a second angle position, the at least one operating parameter adjusting element 2213 is exposed to being conveniently adjusted.

Figure 20B:
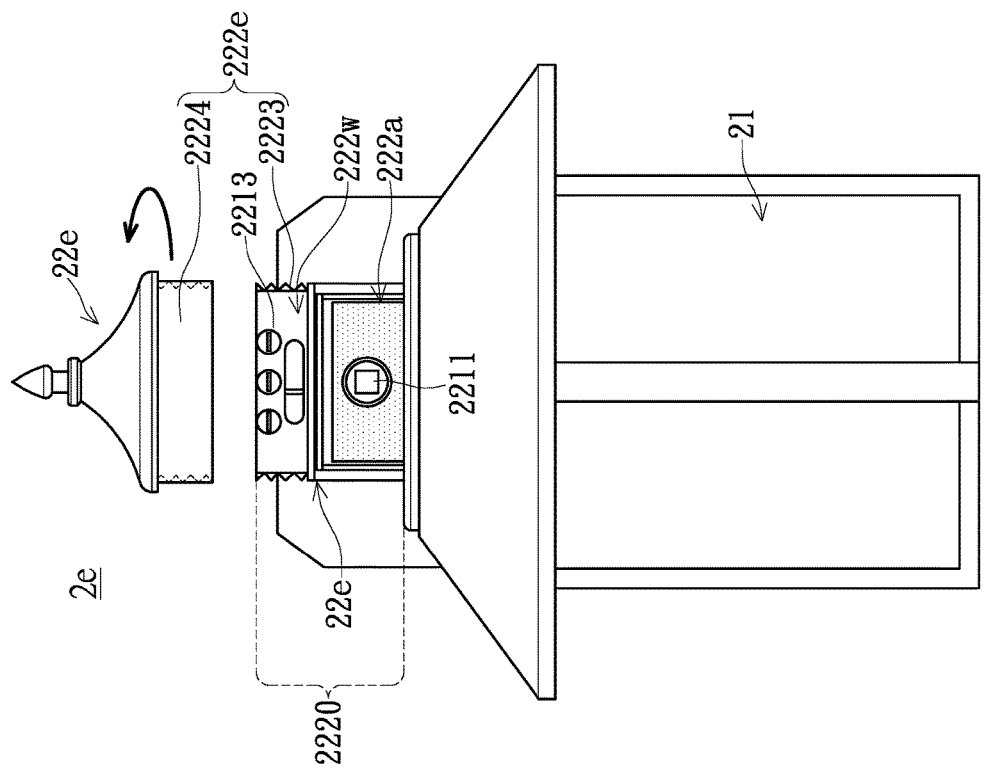
FIG. 20B shows a front view of the sensing lamp in an adjustment status through a thread structure according to FIG. 20A of the present disclosure.
Figure 20A:
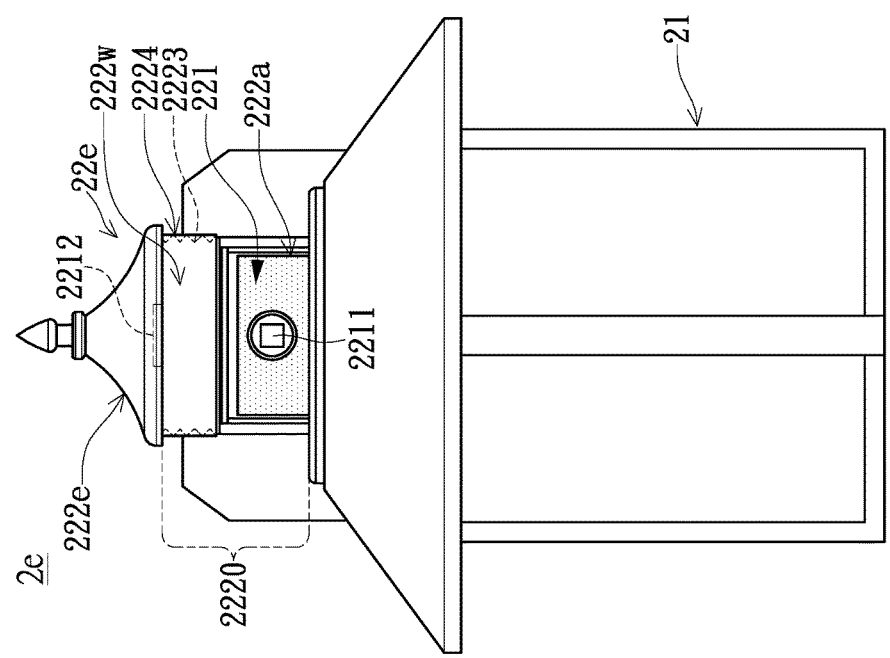
FIG. 20A shows a front view of the sensing lamp with a rotatable portion in a normal status according to FIG. 4 of the present disclosure.

FIG. 20A and FIG. 20B are schematic views of a sensing wall lamp 2e configured with a control module 22e integrated with a light body 21 of the sensing wall lamp 2e, wherein the control module 22e includes a sensing unit 221 and a cover 222e. The sensing unit 221 is configured with at least one sensor 2211, at least one operating parameter adjusting element 2213, a control circuit 2212, and a space 2220 to accommodate the at least one sensor 2211, the at least one operating parameter adjusting element 2213 and the control circuit 2212, wherein the at least one sensor 2211 and the at least one operating parameter adjusting element 2213 are electrically coupled with the control circuit 2212 respectively. The at least one operating parameter adjusting element 2213 and the at least one sensor 2211 are disposed and vertically aligned on a front side of the sensing unit 221 facing a detection space. The cover 222e is further divided into a first portion 2223 and a second portion 2224 detachably connected through a thread structure. The first portion 2223 is designed with a first opening portion 222a to dispose the at least one sensor 2211 for performing a sensing function in a detection space. The second portion 2224 is rotatable against the first portion 2223. Refer to FIG. 20A. When the second portion 2224 is rotated to a first angle position, the second portion 2224 is thereby fastened with the first portion 2223 to fully cover a second opening portion 222w and the at least one operating parameter adjusting element 2213 to protect against any damage by any external factors. Refer to FIG. 20B. When the second portion 2224 is rotated to a second angle position, the second portion 2224 is detachably removable to uncover the second opening portion 222w and the at least one operating parameter adjusting element 2213 such that the at least one operating parameter adjusting element 2213 is exposed to being adjusted.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:
1. A sensing lamp comprising:
a lamp body, for accommodating a light source inside;
a sensing module, directly connected with the lamp body, for performing a forward sensing function and controlling an on/off illumination performance, the sensing module further comprising;

a sensing unit, having at least one sensor, a control circuit and at least one parameter adjusting element; the at least one sensor and the at least one parameter adjusting element being electrically coupled to the control circuit; a first side of the sensing unit being provided with the at least one sensor and a second side of the sensing unit being provided with the at least one parameter adjusting element, the first side of the sensing unit and the second side of the sensing unit being disposed in an opposite direction against each other, the control circuit being disposed inside the sensing module; and
a cover, partially covering the sensing unit; and
a support unit, configured with at least one tubular supporting arm fastened and connected with a back plate mounted on a wall electric outlet for holding the lamp body and the sensing module and for accommodating power wires for delivering an electric power from the wall electric outlet thru the back plate to the lamp body and the sensing module;
wherein the lamp body and the sensing module are aligned along a central axis passing thru a center of the lamp body and the center of the sensing module, wherein the sensing unit is capable of rotating around the central axis to a first angle position and to a second angle position, wherein when the sensing unit is rotated to the first angle position, the at least one parameter adjusting element is blocked by the back plate and the at least one sensor on the first side of the sensing unit is able to perform the forward sensing function; wherein when the sensing unit is rotated to the second angle position, the at least one parameter adjusting element on the opposite side of the sensing unit is not blocked and is exposed to being conveniently adjusted; wherein the lamp body is constructed as being non-angle adjustable for a vertical swing around an axis perpendicular to the central axis; and wherein the at least one tubular supporting arm is either connected to the sensing module or connected to the lamp body for delivering the electric power to the control circuit and the light source for operating the sensing lamp.

2. The sensing lamp according to claim 1, wherein the sensing module is disposed on a top side of the lamp body, wherein the sensing unit and the light body are rotatably connected, wherein the cover of the sensing module is fastened to a top side of the lamp body, wherein the cover is designed with a front opening for exposing the at least one sensor or the at least one parameter adjusting element; wherein when the sensing unit is rotated to the first angle position, the at least one sensor is moved to locate inside the front opening and is exposed for performing at least the forward sensing function, wherein when the sensing unit is rotated to the second angle position, the at least one parameter adjusting element is moved to locate inside the front opening and is exposed to being conveniently adjusted thru the front opening.

3. The sensing lamp according to claim 1, wherein the sensing module is disposed on a top side of the lamp body, wherein the sensing module is rotatably connected with the lamp body, wherein the sensing module including the sensing unit and the cover is rotatable around the central axis to the first angle position and to the second angle position, wherein when the sensing module is rotated to the first angle position, the at least one parameter adjusting element is blocked by the back plate and the at least one sensor is able to perform the forward sensing function; wherein when the sensing module is rotated to the second angle position, the at least one parameter adjusting element is not blocked and is exposed to being conveniently adjusted.

4. The sensing lamp according to claim 1, wherein the sensing module is disposed on a bottom side of the lamp body, wherein the sensing module is rotatably connected with the lamp body, wherein the sensing module including the sensing unit and the cover is rotatable around the central axis to the first angle position and to the second angle position, wherein when the sensing module is rotated to the first angle position, the at least one parameter adjusting element is blocked by the back plate and the at least one sensor is able to perform the forward sensing function; wherein when the sensing module is rotated to the second angle position, the at least one parameter adjusting element is not blocked and is exposed to being conveniently adjusted.

5. The sensing lamp according to claim 1, wherein the sensing module is disposed and fixed on a top side of the lamp body, wherein the at least one supporting tubular arm is designed with an arc shape to connect to the sensing module from a top end of the sensing module thru a swivel device configured to allow the sensing module and the lamp body to rotate together around the central axis to the first angle position and to the second angle position, wherein when the sensing lamp is rotated to the first angle position, the at least one parameter adjusting element is blocked by the back plate and the at least one sensor is able to perform the forward sensing function; wherein when the sensing lamp is rotated to the second angle position, the at least one parameter adjusting element is not blocked and is exposed to being conveniently adjusted.

6. The sensing lamp according to claim 1, wherein the at least one tubular supporting arm is integrated with the lamp body.

7. The sensing lamp according to claim 1, wherein the sensing module is disposed on a bottom side of the lamp body, wherein the sensing unit and the light body are rotatably connected, wherein the cover is fastened to the bottom side of the lamp body, wherein the cover is configured with a front opening for exposing the at least one sensor or the at least one parameter adjusting element; wherein when the sensing unit is rotated to the first angle position, the at least one sensor is moved to locate inside the front opening and is thereby exposed for performing the forward sensing function, wherein when the sensing unit is rotated to the second angle position, the at least one parameter adjusting element is moved to locate inside the front opening and is thereby exposed to being conveniently adjusted thru the front opening.

8. The sensing lamp according to claim 1, wherein the sensing module is disposed and fixed on a bottom side of the lamp body, wherein the at least one supporting tubular arm is connected to the sensing module from a bottom end of the sensing module thru a swivel base, wherein the swivel base is designed to hold the sensing module and the lamp body to rotate together around the central axis to the first angle position and to the second angle position, wherein when the sensing lamp is rotated to the first angle position, the at least one parameter adjusting element is blocked by the back plate and the at least one sensor is able to perform the forward sensing function; wherein when the sensing lamp is rotated to the second angle position, the at least one parameter adjusting element is not blocked and is exposed to being conveniently adjusted.

9. The sensing lamp according to claim 1, wherein the at least one sensor is a passive infrared ray motion sensor comprising a condensing lens integrated with at least one infrared ray signal detection circuitry, wherein the condensing lens is designed with a partial cylindrical condensing lens able to perform a horizontal detection angle between 100 degrees and 270 degrees depending on an arc angle of the partial cylindrical condensing lens.

10. The sensing lamp according to claim 9, wherein the passive infrared ray motion sensor is configured with a depression angle against an axis perpendicular to the central axis of the sensing unit for performing both a downward as well as the forward sensing function.

11. The sensing lamp according to claim 9, wherein the passive infrared ray motion sensor is designed with a horizontal pivot allowing the condensing lens to swing vertically for making an adjustment of a depression angle against an axis perpendicular to the central axis for performing both a downward and the forward sensing function.

12. The sensing lamp according to claim 1, wherein the sensing unit is rotated to expose the at least one sensor or the at least one parameter adjusting element without using a tool.

13. The sensing lamp according to claim 1, wherein the at least one sensor includes a photo sensor.

14. The sensing lamp according to claim 1, wherein the at least one sensor is a passive infrared ray motion sensor comprising a condensing lens integrated with an infrared ray signal detection circuitry, wherein the passive infrared ray sensor is designed with an eyeball construction allowing the passive infrared ray sensor to make a universal angle adjustment for selecting and performing a desired sensing function.

15. A passive infrared ray sensing lamp, comprising:
a lamp body, for accommodating a light source inside;
a sensing module, directly connected with the lamp body for performing a forward sensing function and controlling an on/off illumination performance, the sensing module further comprising;
a sensing unit, having at least one passive infrared ray motion sensor, a control circuit and at least one parameter adjusting element; the at least one passive infrared ray motion sensor and the at least one parameter adjusting element being electrically coupled to the control circuit; a first side of the sensing unit being provided with the at least one passive infrared ray motion sensor and a second side of the sensing unit being provided with the at least one parameter adjusting element, the first side of the sensing unit and the second side of the sensing unit being disposed in an opposite direction against each other, the control circuit being disposed inside the sensing module; the at least one passive infrared ray motion sensor being configured with a partial cylindrical condensing lens and at least one infrared ray detection circuitry, the partial cylindrical condensing lens being designed with a horizontal detection angle ranging from 100 degrees to 270 degrees depending on an arc angle of the partial cylindrical condensing lens; and
a cover, partially covering the sensing unit; and
a support unit, configured with at least one tubular supporting arm fastened and connected with a back plate mounted on a wall electric outlet for holding the lamp body and the sensing module and for accommodating power wires for delivering an electric power from the wall electric outlet thru the back plate to the lamp body and the sensing module;

wherein the lamp body and the sensing module are aligned along a central axis passing thru a center of the lamp body and the center of the sensing module, wherein the sensing module is disposed on a top side of the lamp body, wherein the sensing module is rotatably connected with the lamp body, wherein the sensing module including the sensing unit and the cover is rotatable around the central axis to a first angle position and to a second angle position, wherein when the sensing module is rotated to the first angle position, the at least one parameter adjusting element is blocked by the back plate and the at least one passive infrared ray motion sensor is able to perform the forward sensing function; wherein when the sensing module is rotated to the second angle position, the at least one parameter adjusting element is not blocked and is exposed to being conveniently adjusted; wherein the lamp body is constructed as being non-angle adjustable for a vertical swing around an axis perpendicular to the central axis.

16. A passive infrared ray sensing lamp, comprising:
a lamp body, for accommodating a light source inside;
a sensing module, directly connected with the lamp body for performing a forward sensing function and controlling an on/off illumination performance, the sensing module further comprising;
  a sensing unit, having at least one passive infrared ray motion sensor, a control circuit and at least one parameter adjusting element; the at least one passive infrared ray motion sensor and the at least one parameter adjusting element being electrically coupled to the control circuit; a first side of the sensing unit being provided with the at least one passive infrared ray motion sensor and a second side of the sensing unit being provided with the at least one parameter adjusting element, the first side of the sensing unit and the second side of the sensing unit being disposed in an opposite direction against each other, the control circuit being disposed inside the sensing module; the at least one passive infrared ray motion sensor being configured with a partial cylindrical condensing lens and at least one infrared ray detection circuitry, the partial cylindrical condensing lens being designed with a horizontal detection angle ranging from 100 degrees to 270 degrees depending on an arc angle of the partial cylindrical condensing lens; and
  a cover, partially covering the sensing unit; and
a support unit, configured with at least one tubular supporting arm fastened and connected with a back plate mounted on a wall electric outlet for holding the lamp body and the sensing module for accommodating power wires for delivering an electric power from the wall electric outlet thru the back plate to the lamp body and the sensing module;
wherein the lamp body and the sensing module are aligned along a central axis passing thru a center of the lamp body and the center of the sensing module,
wherein the sensing module is disposed on a bottom side of the lamp body, wherein the sensing module is rotatably connected with the lamp body, wherein the sensing module including the sensing unit and the cover is rotatable around the central axis to a first angle position and to a second angle position, wherein when the sensing module is rotated to the first angle position, the at least one parameter adjusting element is blocked by the back plate and the at least one passive infrared ray motion sensor is able to perform the forward sensing function; wherein when the sensing module is rotated to the second angle position, the at least one parameter adjusting element is not blocked and is exposed to being conveniently adjusted; wherein the lamp body is constructed as being non-angle adjustable for a vertical swing around an axis perpendicular to the central axis.

17. A passive infrared ray sensing lamp, comprising:
a lamp body, for accommodating a light source inside;
a sensing module, directly connected with the lamp body for performing a forward sensing function and controlling an on/off illumination performance, the sensing module further comprising;
  a sensing unit, having at least one passive infrared ray motion sensor, a control circuit and at least one parameter adjusting element; the at least one passive infrared ray motion sensor and the at least one parameter adjusting element being electrically coupled to the control circuit; a first side of the sensing unit being provided with the at least one passive infrared ray motion sensor and a second side of the sensing unit being provided with the at least one parameter adjusting element, the first side of the sensing unit and the second side of the sensing unit being disposed in an opposite direction against each other, the control circuit being disposed inside the sensing module; the passive infrared ray sensor being configured with a partial cylindrical condensing lens and at least one infrared ray detection circuitry, the partial cylindrical condensing lens being designed with a horizontal detection angle ranging from 100 degrees to 270 degrees depending on an arc angle of the partial cylindrical condensing lens; and
  a cover, partially covering the sensing unit; and
a support unit, configured with at least one tubular supporting arm fastened and connected with a back plate mounted on a wall electric outlet for holding the lamp body and the sensing module and for accommodating power wires for delivering an electric power from the wall electric outlet thru the back plate to the lamp body and the sensing module;
wherein the lamp body and the sensing module are aligned along a central axis passing thru a center of the lamp body and the center of the sensing module, wherein the sensing module is disposed and fixed on a top side of the lamp body, wherein the at least one supporting tubular arm is designed with an arc shape to connect to the sensing module from a top end of the sensing module thru a swivel device configured to allow the sensing module and the lamp body to rotate together around the central axis to a first angle position and to a second angle position, wherein when the sensing lamp is rotated to the first angle position, the at least one parameter adjusting element is blocked by the back plate and the at least one passive infrared ray motion sensor is able to perform the forward sensing function; wherein when the sensing lamp is rotated to the second angle position, the at least one parameter adjusting element is not blocked and is exposed to being conveniently adjusted.

18. A passive infrared ray sensing lamp, comprising:
a lamp body, for accommodating a light source inside;
a sensing module, directly connected with the lamp body for performing a forward sensing function and controlling an on/off illumination performance,
the sensing module further comprising;

a sensing unit, having at least a one passive infrared ray motion sensor, a control circuit and at least one parameter adjusting element; the at least one passive infrared ray motion sensor and the at least one parameter adjusting element being electrically coupled to the control circuit; a first side of the sensing unit being provided with the at least one passive infrared ray motion sensor and a second side of the sensing unit being provided with the at least one parameter adjusting element, the first side of the sensing unit and the second side of the sensing unit being disposed in an opposite direction against each other, the control circuit being disposed inside the sensing module; the at least one passive infrared ray motion sensor being configured with a partial cylindrical condensing lens and at least one infrared ray detection circuitry, the partial cylindrical condensing lens being featured with a horizontal detection angle ranging from 100 degrees to 270 degrees depending on an arc angle of the partial cylindrical condensing lens; and a cover, partially covering the sensing unit; and a support unit, configured with at least one tubular supporting arm fastened and connected with a back plate mounted on a wall electric outlet for holding the lamp body and the sensing module and for accommodating power wires for delivering an electric power from the wall electric outlet thru the back plate to the lamp body and the sensing module;

wherein the lamp body and the sensing module are aligned along a central axis passing thru a center of the lamp body and the center of the sensing module, wherein the sensing module is disposed and fixed on a bottom side of the lamp body, wherein the at least one supporting tubular arm is connected to the sensing module from a bottom end of the sensing module thru a swivel base, wherein the swivel base is designed to hold the lamp body while allowing the sensing module and the lamp body to rotate together around the central axis to a first angle position and to a second angle position, wherein when the sensing lamp is rotated to the first angle position, the at least one parameter adjusting element is blocked by the back plate and the at least one passive infrared ray motion sensor is able to perform the forward sensing function; wherein when the sensing lamp is rotated to the second angle position, the at least one parameter adjusting element is not blocked and is exposed to being conveniently adjusted.

19. A sensing lamp comprising:

at least one lamp body, for accommodating at least one light source inside;

a sensing module, electrically and mechanically coupled with at least one lamp body, for performing at least one sensing function, controlling an illumination performance and performing a security surveillance function, the sensing module further comprising;

a sensing unit, including at least one sensor, at least one parameter adjusting element and a control circuit comprising at least a controller; the at least one sensor and the at least one parameter adjusting element being electrically and respectively coupled to the controller of the control circuit; a first side of the sensing unit being provided with the at least one sensor and a second side of the sensing unit being provided with the at least one parameter adjusting element, the first side of the sensing unit and the second side of the sensing unit being disposed in an opposite direction against each other, the at least one control circuit being disposed inside the sensing module; and a cover, partially covering the sensing unit; and a support unit, configured with at least one tubular supporting arm fastened and connected with a back plate mounted on a wall electric outlet for holding the at least one lamp body and the sensing module and for accommodating power wires for delivering an electric power from the wall electric outlet thru the back plate to the at least one lamp body and the sensing module;

wherein the sensing unit is capable of rotating around a central axis of the sensing unit to a first angle position and to a second angle position, wherein when the sensing unit is rotated to the first angle position, the at least one parameter adjusting element is blocked by the back plate and the at least one sensor on the first side of the sensing unit is able to perform the at least one sensing function; wherein when the sensing unit is rotated to the second angle position, the at least one parameter adjusting element on the opposite side of the sensing unit is not blocked and is exposed to being conveniently adjusted;

wherein the at least one tubular supporting arm is either connected to the sensing module or connected to the at least one lamp body for delivering the electric power to the control circuit and the light source for operating the sensing lamp.

20. The sensing lamp according to claim 19, wherein the sensing unit has a first sensor being a photo sensor, and a second sensor being a motion sensor; the photo sensor has a light sensing circuit, and the motion sensor has a motion detection circuit, wherein the photo sensor, the motion sensor and the at least one parameter adjusting element are electrically and respectively coupled with the controller of the control circuit; wherein at dusk when an ambient light detected by the photo sensor is lower than a predetermined value, the controller manages to activate the motion sensor to perform a motion sensing function, wherein when a motion is detected by the motion sensor, the controller operates to perform a high-level illumination, wherein when the ambient light detected by the photo sensor is higher than a second predetermined value, the controller operates to deactivate the motion sensor.

21. The sensing lamp according to claim 19, wherein the sensing unit is configured with a first sensor being a photo sensor comprising a light sensing circuit and a second sensor being a video camera sensor comprising a video signal processing circuit; wherein the photo sensor, the video camera sensor and the at least one parameter adjusting element are electrically and respectively coupled with the controller of the control circuit; wherein at dusk when an ambient light detected by the photo sensor is lower than a predetermined value, the controller manages to turn on the at least one light source and to activate the video camera sensor to perform a video surveillance function; wherein when the ambient light detected by the photo sensor is higher than a second predetermined value, the controller operates to turn off the at least one light source.

22. The sensing lamp according to claim 19, wherein the sensing unit is configured with a first sensor being a motion sensor comprising a motion sensing circuit, and a second sensor being a video camera sensor comprising a video signal processing circuit; wherein the motion sensor, the video camera sensor and the at least one parameter adjusting element are electrically and respectively coupled with the controller of the control circuit; wherein when a motion is detected by the motion sensor, the video camera sensor is activated to perform a video surveillance function for a predetermined time duration, wherein upon a maturity of the predetermined time duration with no new motion being further detected, the controller operates to deactivate the video camera sensor and cease to perform the video surveillance function.

23. The sensing lamp according to claim 19, wherein the sensing unit is configured with a first sensor being a photo sensor comprising a light sensing circuit, a second sensor being a motion sensor to perform a motion sensing function, and a third sensor being a video camera sensor comprising at least a video signal processing circuit; wherein the photo sensor, the motion sensor, the video camera sensor and the at least one parameter adjusting element are electrically and respectively coupled with the controller of the control circuit; wherein at dusk when an ambient light detected by the photo sensor is lower than a predetermined value, the controller operates to activate the motion sensor, wherein when a motion is detected by the motion sensor, the controller manages the at least one light source to perform a high-level illumination and simultaneously operates to activate the video camera sensor to perform a video surveillance function for a predetermined time duration, wherein upon a maturity of the predetermined time duration with no further motion being detected, the controller manages to deactivate the video camera sensor.

24. The sensing lamp according to claim 23, wherein at dusk when the motion sensor is activated by the controller, the controller simultaneously manage the at least one light source to perform a low-level illumination.

25. The sensing lamp according to claim 21, wherein a remote control transmitter is further installed to be electrically coupled with the controller and the video signal processing circuit for performing a function of a remote video surveillance.

26. The sensing lamp according to claim 22, wherein a remote control transmitter is further installed to be electrically coupled with the controller and the video signal processing circuit for performing a function of a remote video surveillance.

27. The sensing lamp according to claim 23, wherein a remote control transmitter is further installed to be electrically coupled with the controller and the video signal processing circuit for performing a function of a remote video surveillance.

* * * * *